(12) United States Patent
Minefuji

(10) Patent No.: US 9,110,277 B2
(45) Date of Patent: Aug. 18, 2015

(54) PROJECTION ZOOM LENS

(71) Applicant: SEIKO EPSON CORPORATION, Tokyo (JP)

(72) Inventor: Nobutaka Minefuji, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 69 days.

(21) Appl. No.: 13/650,755

(22) Filed: Oct. 12, 2012

(65) Prior Publication Data

US 2013/0094096 A1 Apr. 18, 2013

(30) Foreign Application Priority Data

Oct. 17, 2011 (JP) .................. 2011-227664

(51) Int. Cl.
| | |
|---|---|
| G02B 3/00 | (2006.01) |
| G02B 9/00 | (2006.01) |
| G02B 13/16 | (2006.01) |
| G02B 13/22 | (2006.01) |
| G02B 15/177 | (2006.01) |

(52) U.S. Cl.
CPC .............. G02B 13/16 (2013.01); G02B 13/22 (2013.01); G02B 15/177 (2013.01)

(58) Field of Classification Search
USPC ......... 359/680, 682, 684, 693, 698, 658–659, 359/663, 671–676
See application file for complete search history.

(56) References Cited

U.S. PATENT DOCUMENTS

| | | | |
|---|---|---|---|
| 4,653,872 A | 3/1987 | Takahashi | |
| 5,469,237 A * | 11/1995 | Itoh et al. | ...... 396/318 |
| 6,542,311 B2 | 4/2003 | Nagahara | |
| 6,587,279 B2 | 7/2003 | Narimatsu et al. | |
| 6,633,436 B2 | 10/2003 | Wada et al. | |
| 6,885,506 B2 | 4/2005 | Yoneyama | |
| 7,079,324 B2 | 7/2006 | Yamasaki | |
| 7,212,348 B2 | 5/2007 | Liao | |
| 7,215,477 B2 | 5/2007 | Yamasaki et al. | |
| 7,397,610 B2 | 7/2008 | Wada | |

(Continued)

FOREIGN PATENT DOCUMENTS

| | | |
|---|---|---|
| CN | 1940632 A | 4/2007 |
| CN | 101331418 A | 12/2008 |

(Continued)

OTHER PUBLICATIONS

Jun. 12, 2014 Office Action issued in U.S. Appl. No. 13/650,612.

(Continued)

*Primary Examiner* — Stephone B Allen
*Assistant Examiner* — Brandi Thomas
(74) *Attorney, Agent, or Firm* — Oliff PLC

(57) ABSTRACT

A projection zoom lens is formed of the following lens groups sequentially arranged from the high magnification side: a first lens group fixed at the time of zooming and having negative power; a second lens group moved along the optical axis at the time of zooming and having negative power; a third lens group moved at the time of zooming and having positive power; a fourth lens group moved at the time of zooming; and a fifth lens group fixed at the time of zooming and having positive power. When the total lens system operating at the wide angle end has a focal length Fw, and the first lens group has a focal length F1, the following conditional expression is satisfied.

$$-0.5 < Fw/F1 < -0.1 \qquad (1)$$

12 Claims, 16 Drawing Sheets

(56) References Cited

U.S. PATENT DOCUMENTS

| | | |
|---|---|---|
| 7,586,690 B2 | 9/2009 | Yamada |
| 7,706,079 B2 | 4/2010 | Kawana |
| 7,715,111 B2 | 5/2010 | Yamamoto et al. |
| 7,855,840 B2 | 12/2010 | Minefuji |
| 7,869,134 B2 | 1/2011 | Matsusaka et al. |
| 7,889,431 B2 | 2/2011 | Nagahara |
| 8,405,918 B2 | 3/2013 | Kato et al. |
| 8,472,126 B2 | 6/2013 | Luo |
| 8,526,115 B2 | 9/2013 | Lin |
| 2004/0012704 A1 | 1/2004 | Hagimori et al. |
| 2004/0080632 A1 | 4/2004 | Iwasawa et al. |
| 2005/0200967 A1 | 9/2005 | Yamasaki et al. |
| 2006/0044423 A1 | 3/2006 | Hagimori et al. |
| 2006/0280498 A1 | 12/2006 | Souma et al. |
| 2007/0070523 A1 | 3/2007 | Noda |
| 2007/0223104 A1 | 9/2007 | Chuang et al. |
| 2008/0304162 A1* | 12/2008 | Yamasaki .................. 359/683 |
| 2009/0109548 A1 | 4/2009 | Kimura |
| 2009/0115884 A1 | 5/2009 | Matsusaka |
| 2009/0168197 A1 | 7/2009 | Hung et al. |
| 2009/0257129 A1 | 10/2009 | Kawana |
| 2009/0303612 A1 | 12/2009 | Fukuta et al. |
| 2010/0208358 A1* | 8/2010 | Minefuji .................. 359/682 |
| 2010/0309562 A1* | 12/2010 | Amano .................. 359/682 |
| 2012/0188436 A1 | 7/2012 | Ozaki |
| 2013/0027785 A1 | 1/2013 | Kim et al. |
| 2013/0094096 A1 | 4/2013 | Minefuji |

FOREIGN PATENT DOCUMENTS

| | | |
|---|---|---|
| CN | 101470256 A | 7/2009 |
| GB | 2 102 142 A | 1/1983 |
| JP | A-2001-311872 | 11/2001 |
| JP | A-2002-72094 | 3/2002 |
| JP | A-2003-202498 | 7/2003 |
| JP | 2004-037927 A | 2/2004 |
| JP | 2004-037966 A | 2/2004 |
| JP | 2005-164839 A | 6/2005 |
| JP | A-2006-39034 | 2/2006 |
| JP | 2006-343554 A | 12/2006 |
| JP | 2007-156268 A | 6/2007 |
| JP | 2007-304268 A | 11/2007 |
| JP | 2009-047722 A | 3/2009 |
| JP | 2009-109630 A | 5/2009 |
| JP | 2010-197742 A | 9/2010 |
| JP | A-2010-190939 | 9/2010 |
| JP | 2010-224263 A | 10/2010 |
| JP | 2011-059496 A | 3/2011 |
| JP | A-2011-069959 | 4/2011 |
| WO | 2008-075566 A1 | 6/2008 |

OTHER PUBLICATIONS

Driggers, Ronald (ed.). "Ophthalmic Optics." Encyclopedia of Optical Engineering. vol. 2: CRC, 2003. 1567.

May 6, 2015 Office Action issued in U.S. Appl. No. 13/650,612.

\* cited by examiner

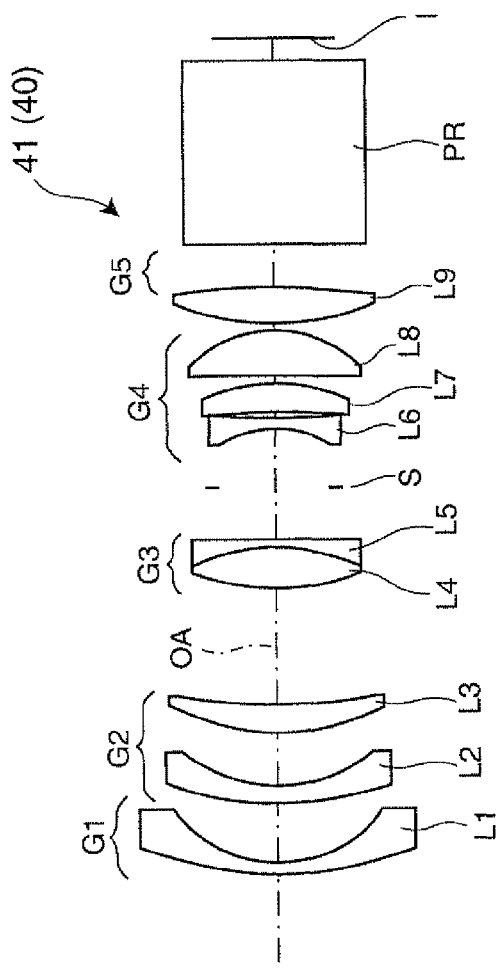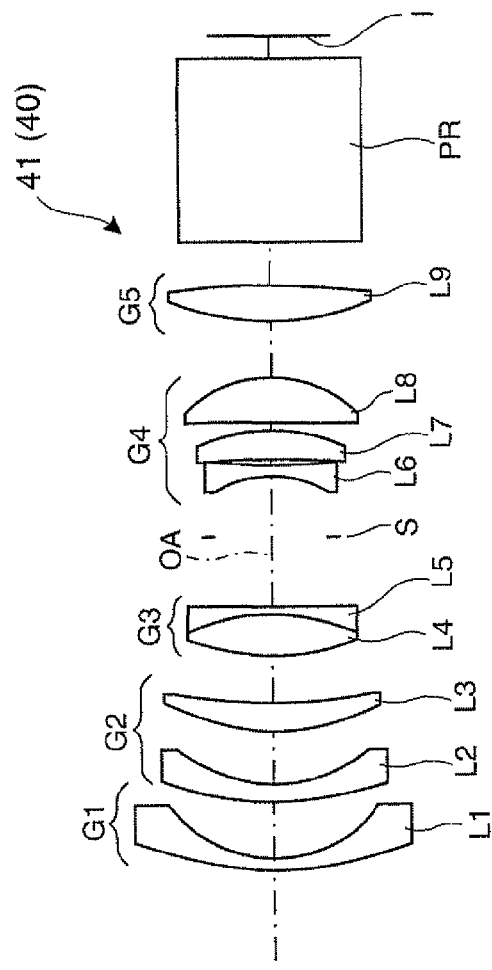
FIG. 3A
FIG. 3B

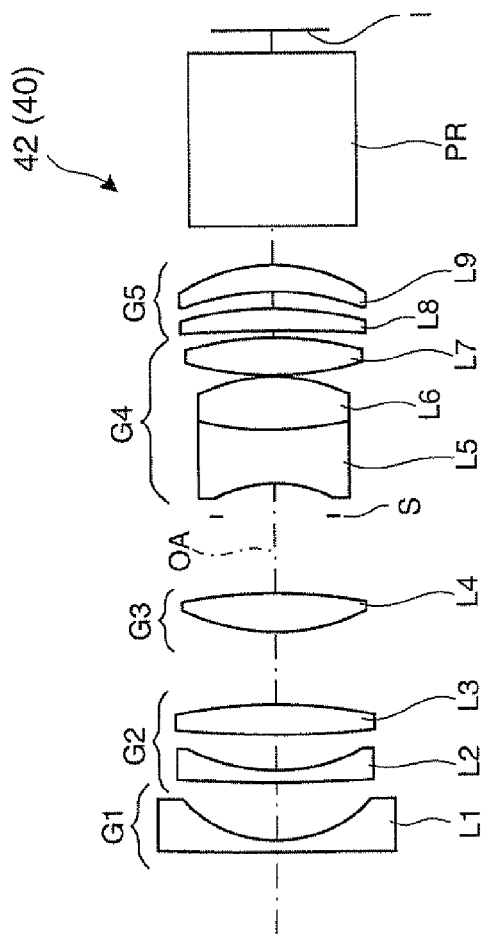
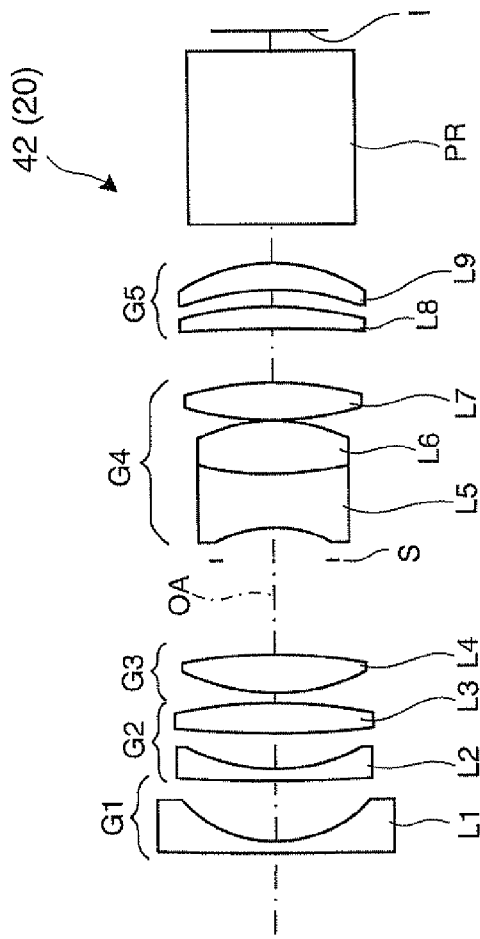
FIG. 5A
FIG. 5B

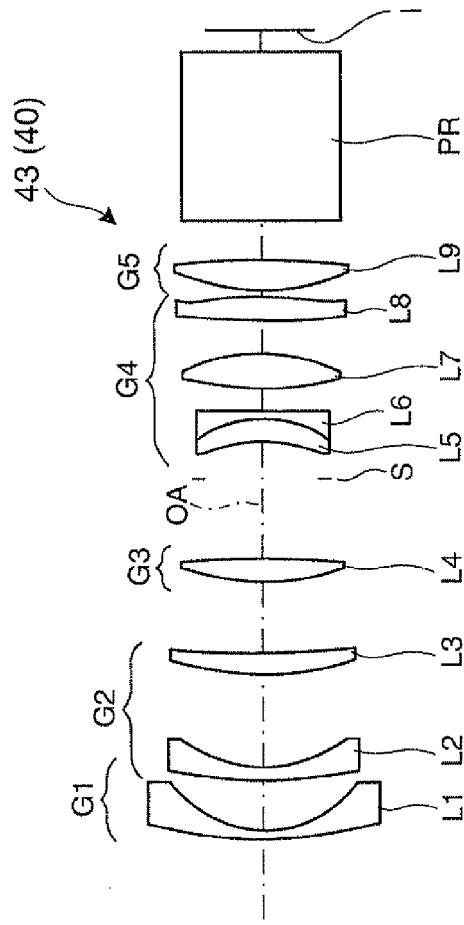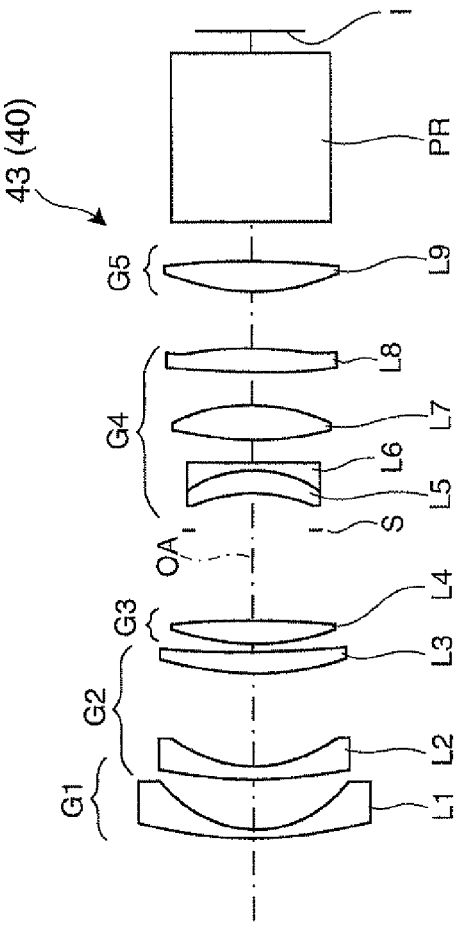
FIG. 7A
FIG. 7B

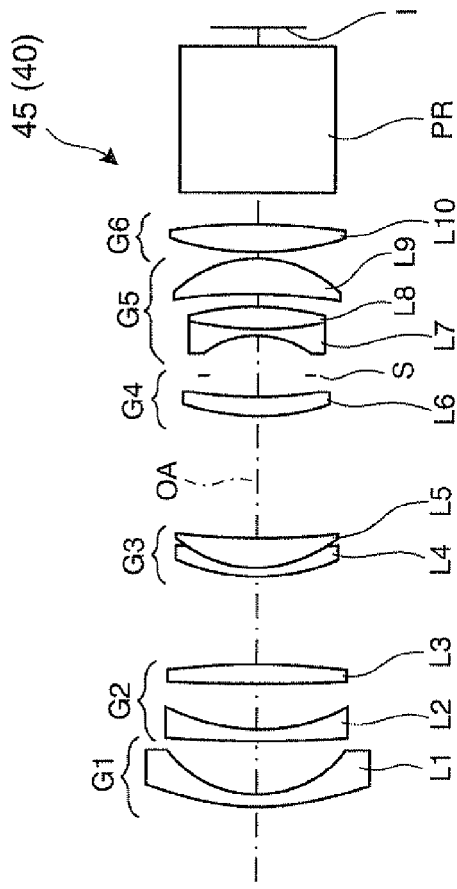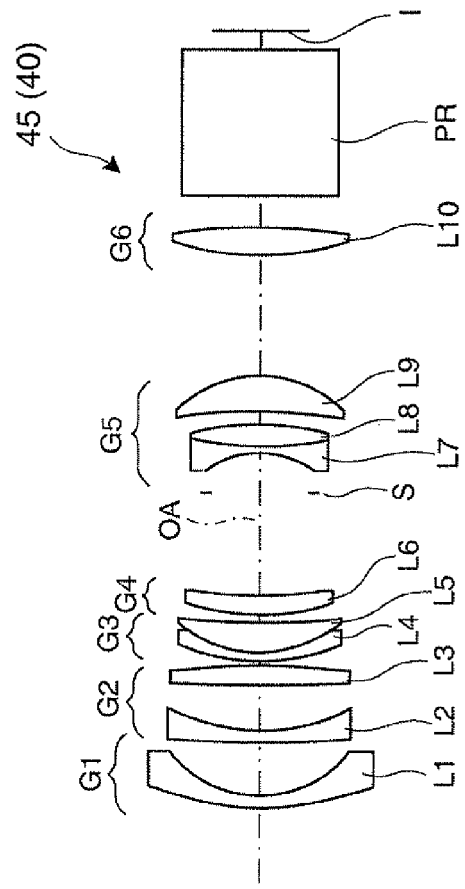
FIG. 11A
FIG. 11B

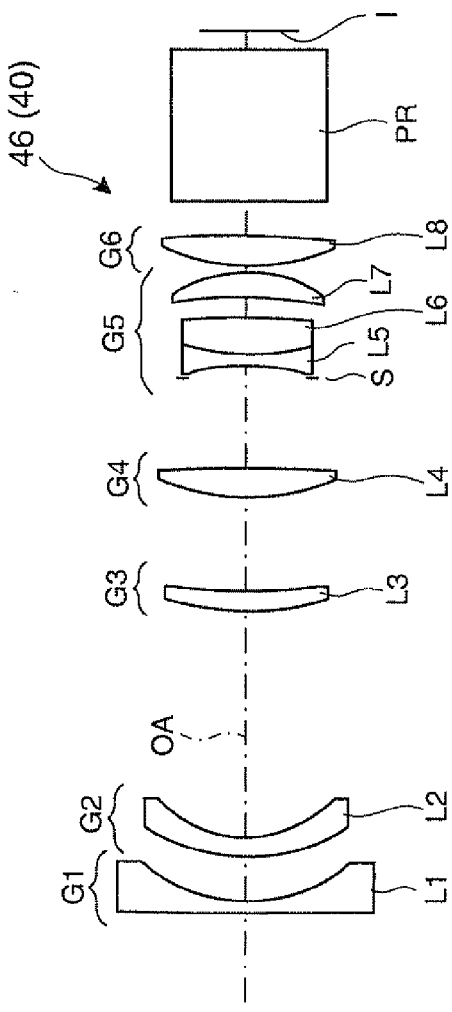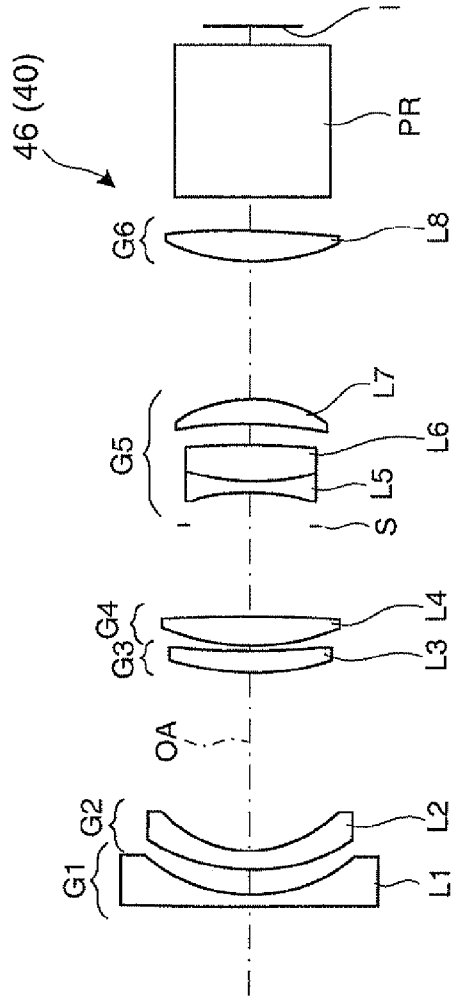
FIG. 13A
FIG. 13B

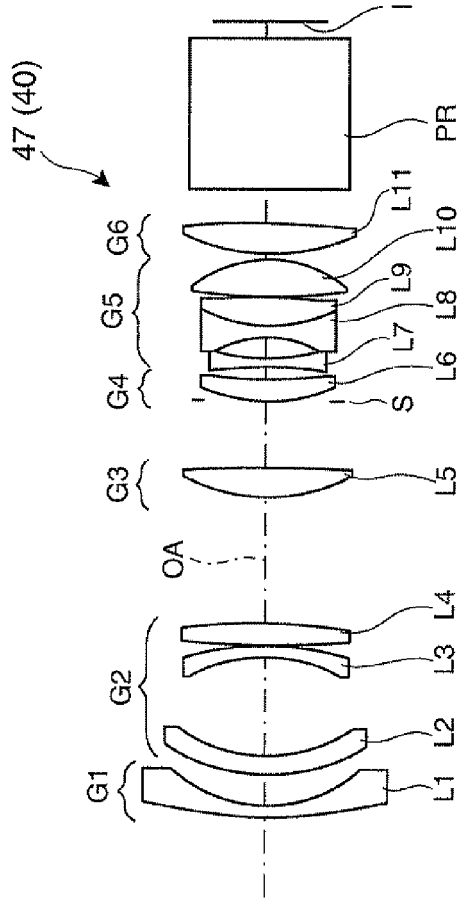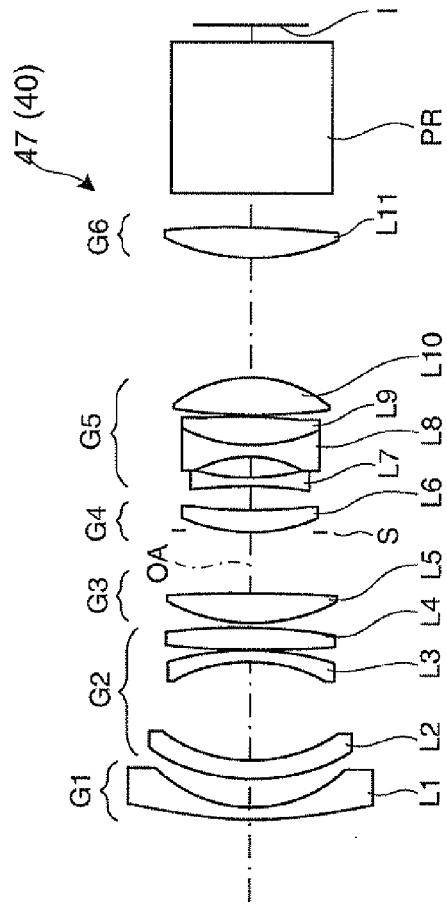
FIG. 15A
FIG. 15B

PROJECTION ZOOM LENS

BACKGROUND

1. Technical Field

The present invention relates to a projection zoom lens that is appropriately incorporated into a projector that enlarges and projects an image formed on an image display device.

2. Related Art

An optical system for a projector that enlarges and projects an image formed on an image display device needs to have (1) a long back focal length that allows a prism for combining light fluxes from three liquid crystal panels for red, green, and blue color components to be disposed, (2) a satisfactory telecentric characteristic that prevents color unevenness from occurring, and (3) a small f-number, that is, a bright optical system that allows light from an illumination system to be efficiently introduced. In recent years, the optical system also needs in many cases to have (4) not only a zooming capability but also a relatively wide angle of view at the same time that allows the projector to be readily installed in a narrow space.

To provide a projection zoom lens having a wide angle of view as well as a long back focal length, a retrofocus-type lens configuration is used in many cases, and a lens group having large negative power is typically disposed on the enlargement side.

To ensure high resolution and a flat image plane across a wide projection range of a projection zoom lens, a lens group on the enlargement side and a lens group on the reduction side are fixed and a lens group disposed between the two lens groups is moved to change the magnification in zooming operation, and the lens group on the enlargement side is moved to bring a subject into focus in focusing operation in many cases.

The focusing group having large negative power and disposed on the enlargement side as described above is formed of a plurality of lenses having large power factors and has a relatively large size in order to provide a wide angle of view. The focusing group is therefore much larger and heavier than other lens groups.

To move the focusing group forward and backward at the time of focusing, it is typical to connect a frame of the focusing group to a primary lens barrel by using a helicoid screw structure formed along a fixed frame of the primary lens barrel and move the frame of the focusing group forward and backward through rotation. To reduce the overall size of the lens, it is necessary to dispose a helicoid screw portion on the low magnification side with respect to the focusing group. When the focusing group has a long total length and a large weight, however, the focusing group is inclined due to the weight thereof unless a helicoid screw connecting portion is long, resulting in degradation in performance of the lens. In view of the fact described above, it is preferable to minimize the total length of the focusing group and minimize the number of lenses that form the focusing group to reduce the overall weight thereof.

Since it is preferable to reduce the size and weight of the focusing group as described above, a first lens group that works as the focusing group is simplified by forming the first lens group with a single lens in related art examples (see JP-A-2001-311872 and JP-A-2002-72094). The lens described in JP-A-2001-311872 is, however, only as bright as a lens having an f-number of about 2 and only has a half angle of view of about 24°. On the other hand, the lens described in JP-A-2002-72094 is satisfactorily as bright as a lens having an f-number of about 1.7 but still only has a half angle of view of about 24°. As described above, a first lens group formed of a single lens disadvantageously cannot provide a wide angle of view.

On the other hand, there are projection zoom lenses having a half angle of view of about 30° while having a simple configuration and a relatively small number of components (see JP-A-2003-202498 and JP-A-2010-190939). In the lens described in JP-A-2003-202498 having a first lens group formed of two lenses and providing at least a half angle of view of 30°, the focusing group is formed of two glass lenses and is hence disadvantageously inclined by the weight of the glass material. In this case, the performance of the lens is believed to be degraded. To prevent the focusing group from being inclined, it is necessary to maintain sufficient strength of a portion where the focusing group is connected to a primary lens barrel, resulting in an increase in the overall size of the lens. In JP-A-2010-190939, in which a first lens group is formed of two lenses as in JP-A-2003-202498 described above, the weight of the focusing group is reduced by using a resin lens as the lens disposed on the low magnification side in the first lens group. There is, however, still room for improvement because the total length of the focusing group needs to be two lenses long.

To reduce the size and weight of a first lens group while maintaining a wide angle of view, it is conceivable to divide the first lens group into two across which negative power is distributed. That is, for example, the power of a negative lens group on the high magnification side is distributed across first and second negative lens groups (JP-A-2006-039034).

However, in JP-A-2006-039034, in which negative power on the high magnification side is distributed across a five-group configuration formed of negative, negative, positive, positive, and positive lens groups, a first lens group is formed of four lenses, which does not allow satisfactory reduction in size and weight of the first lens group as the focusing group.

As described above, to provide a wide angle of view of at least 30°, it is necessary to use a first lens group formed of at least two lenses, which means that a portion where a frame of the first lens group, which works as the focusing group, fits in a fixed frame of a primary lens barrel needs to be strong enough to support the weight of the lenses. It is therefore desired to improve known lenses in terms of reduction in size, weight, and cost of the lenses.

SUMMARY

An advantage of some aspects of the invention is to provide a projection zoom lens having a wide angle of view and including a small or lightweight first lens group for focusing.

An aspect of the invention is directed to a projection zoom lens including at least the following five lens groups sequentially arranged from a high magnification side: a first lens group fixed at the time of zooming and having negative power; a second lens group moved at the time of zooming and having negative power; a third lens group moved at the time of zooming and having positive power; at least one lens group moved at the time of zooming; and a last lens group fixed at the time of zooming and having positive power. When the total lens system operating at a wide angle end has a focal length Fw, and the first lens group has a focal length F1, the following conditional expression is satisfied.

$$-0.5 < Fw/F1 < -0.1 \tag{1}$$

The conditional expression (1) that the projection zoom lens described above satisfies relates to the ratio of the focal length of the total lens system to the focal length of the first lens group and defines a condition on the power of the first lens group.

In a so-called retrofocus-type projection lens, a lens group having large negative power is disposed on the high magnification side to provide a long back focal length. When the lens group having large negative power is divided into the negative first lens group and the negative second lens group as described herein, the first lens group disposed on the enlargement side can be simplified, and the size and weight of a frame structure of the first lens group, which is a focusing group, can be reduced. As a result, the overall size and weight of the projection lens can be readily reduced.

When Fw/F1 is greater than the upper limit of the conditional expression (1) and the negative power of the first lens group becomes too small, the travel required in focusing operation is too long, which is not preferable. Conversely, when Fw/F1 is smaller than the lower limit of the conditional expression (1) and the negative power of the first lens group becomes too large, the low-magnification-side surface in particular has too small a radius of curvature, which makes it difficult to correct astigmatism and distortion in a well balanced manner.

According to a specific aspect of the invention, in the projection zoom lens described above, the first lens group may be formed of a single negative lens having a concave surface facing a low magnification side. The configuration is advantageous from the viewpoint of correction of field curvature, distortion, and other aberrations.

According to another specific aspect of the invention, the third lens group, which has positive power, may be formed of a single positive lens having a convex surface facing the high magnification side or a doublet formed of positive and negative lenses and having a convex surface facing the high magnification side, and when the third lens group has a focal length F3, the following conditional expression may be satisfied $$0.05 < Fw/F3 < 0.45 \qquad (2)$$

The conditional expression (2) relates to the ratio of the focal length of the total lens system to the focal length of the third lens group having positive power and defines a condition on the power of the third lens group.

The third lens group causes divergent light fluxes having passed through the first and second lens groups to converge and guides the convergent light fluxes to the following lens groups. When the third lens group has the power that falls within the range expressed by the conditional expression (2), the light fluxes that pass through the third lens group can converge appropriately, whereby the amount of aberrations produced by the following lens groups can be reduced.

When Fw/F3 is smaller than the lower limit of the conditional expression (2) and the positive power of the third lens group becomes too small, it is difficult to efficiently guide off-axis light to the lens groups that follow the third lens group and suppress aberrations at the same time, and the first and second lens groups inevitably need to be larger, which is not preferable from the viewpoint of size reduction. Conversely, when Fw/F3 is greater than the upper limit of the conditional expression (2) and the positive power of the third lens group becomes too large, the amount of spherical aberration, coma, and other aberrations produced by the third lens group become too large, and it is difficult to configure the third lens group with a single positive lens or a doublet formed of positive and negative lenses.

According to still another specific aspect of the invention, the last lens group, which has positive power, may be formed of at least one positive lens, and when the last lens group has a focal length FL, the following conditional expression may be satisfied.

$$0.2 < Fw/FL < 0.4 \qquad (3)$$

The conditional expression (3) relates to the ratio of the focal length of the total lens system to the focal length of the last lens group disposed on the reduction side and defines a condition that achieves a satisfactory telecentric characteristic and reduces variation in aberrations produced at the time of zooming.

When Fw/FL is smaller than the lower limit of the conditional expression (3) and the positive power of the last lens group becomes too small, it is difficult to achieve a satisfactory telecentric characteristic. Conversely, when Fw/FL is greater than the upper limit of the conditional expression (3) and the positive power of the last lens group becomes too large, the high-magnification-side surface has too small a radius of curvature, disadvantageously resulting in a difficulty reducing field curvature, astigmatism, and other aberrations produced at the time of zooming.

According to yet another specific aspect of the invention, an aperture stop may be provided between a certain pair of the movable lens groups, which are moved for zooming, and two resin lenses having oppositely signed power factors that are a resin lens disposed on the high magnification side and having negative power and a resin lens disposed on a low magnification side and having positive power may be disposed on opposite sides of the aperture stop. The thus combined two resin lenses having oppositely signed power factors can function as lenses that cancel the amounts of focus change produced thereby with each other.

According to still yet another specific aspect of the invention, when the resin lens having negative power has a power $\phi n$ and the resin lens having positive power has a power $\phi p$, the following conditional expression may be satisfied.

$$-0.02 < \phi p + \phi n < 0 \; (\phi = 1/f) \qquad (4)$$

In the expression, f stands for the focal length and the power $\phi$ corresponds to the focal length f.

The conditional expression (4) defines a condition on power distribution employed when a resin lens having negative power is disposed on the high magnification side with respect to the aperture stop and a resin lens having positive power is disposed on the low magnification side with respect to the aperture stop. In general, when a wide-angle, retrofocus-type projection lens experiences an increase in temperature across the lens, a negative resin lens produces a focus shift in the direction in which the back focal length decreases, whereas a positive resin lens produces a focus shift in the direction in which the back focal length increases in many cases.

When $\phi p + \phi n$ is smaller than the lower limit of the conditional expression (4) and the power of the negative lens becomes much larger than the power of the positive lens, the back focal length decreases as the temperature increases. Conversely, when $\phi p + \phi n$ is greater than the upper limit of the conditional expression (4) and the power of the positive lens becomes much larger than the power of the negative lens, the back focal length increases as the temperature increases, which disadvantageously causes a focus shift when the temperature changes. In view of the fact described above, the amount of focus shift due to a change in temperature can be reduced by setting the ratio of the power of the negative resin lens to the power of the positive resin lens appropriately within the range expressed by the conditional expression (4).

According to further another specific aspect of the invention, an aperture stop may be provided between a certain pair of the movable lens groups, which are moved for zooming, and two resin lenses having oppositely signed power factors may be disposed on the high magnification side with respect to the aperture stop. The thus combined two resin lenses having oppositely signed power factors can function as lenses that cancel the amounts of focus change due to a change in temperature produced thereby with each other. Further, since the lens groups on the high magnification side with respect to the aperture stop are unlikely to be affected by heat generated in the vicinity of the aperture stop because they are close to the atmosphere, the amount of focus shift due to a change in temperature can reliably be reduced by disposing the resin lenses, which are likely to be affected by an increase in temperature, on the high magnification side with respect to the stop.

According to still further another specific aspect of the invention, the two resin lenses having oppositely signed power factors may be disposed adjacent to each other. When the resin lenses are disposed close to each other as described above, the difference in temperature between the reins lenses can be reduced, whereby the amount of focus change can be reduced even when there is a difference in temperature in the projection zoom lens in use.

According to yet further another specific aspect of the invention, the two resin lenses having oppositely signed power factors may be disposed in a single lens group.

According to still yet further another specific aspect of the invention, the two resin lenses having oppositely signed power factors may be disposed in lens groups disposed adjacent to each other.

BRIEF DESCRIPTION OF THE DRAWINGS

The invention will be described with reference to the accompanying drawings, wherein like numbers reference like elements.

FIG. 2A shows a wide angle end state and FIG. 2B shows a telescopic end state.

FIGS. 3A and 3B are cross-sectional views of a projection zoom lens according to Example 1.

FIGS. 5A and 5B are cross-sectional views of a projection zoom lens according to Example 2.

FIGS. 7A and 7B are cross-sectional views of a projection zoom lens according to Example 3.

FIGS. 11A and 11B are cross-sectional views of a projection zoom lens according to Example 5.

FIGS. 13A and 13B are cross-sectional views of a projection zoom lens according to Example 6.

FIGS. 15A and 15B are cross-sectional views of a projection zoom lens according to Example 7.

DESCRIPTION OF EXEMPLARY EMBODIMENTS

A projection zoom lens according to an embodiment of the invention will be described below in detail with reference to the drawings.

Figure 1:
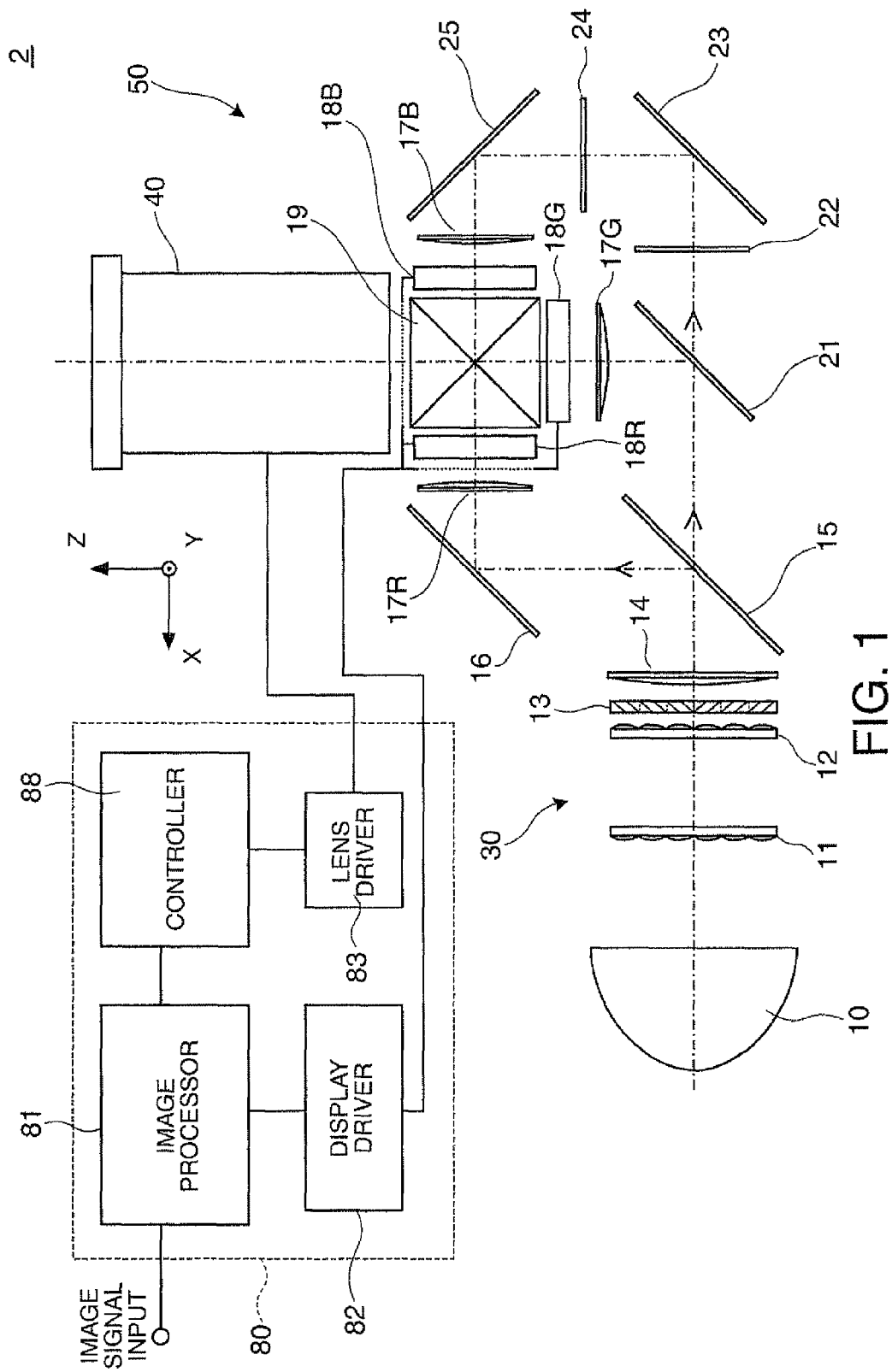
FIG. 1 shows a schematic configuration of a projector into which a projection zoom lens according to an embodiment is incorporated.

A projector 2 into which the projection zoom lens according to the embodiment of the invention is incorporated includes an optical system portion 50 that projects image light and a circuit apparatus 80 that controls the operation of the optical system portion 50, as shown in FIG. 1.

In the optical system portion 50, a light source 10 is, for example, an ultrahigh-pressure mercury lamp that emits light containing R light, G light, and B light. The light source 10 may be another discharge-type light source different from an ultrahigh-pressure mercury lamp or may alternatively be a solid-state light source, such as an LED and a laser. A first optical integration lens 11 and a second optical integration lens 12 each have a plurality of arrayed lens elements. The first optical integration lens 11 divides a light flux from the light source 10 into a plurality of light fluxes. Each of the lens elements of the first optical integration lens 11 focuses the light flux from the light source 10 in the vicinity of the corresponding lens element of the second optical integration lens 12. The lens elements of the second optical integration lens 12, which cooperate with a superimposing lens 14, form images of the lens elements of the first optical integration lens 11 on liquid crystal panels 18R, 18G, and 18B. The configuration described above allows the light from the light source 10 to illuminate entire display areas of the liquid crystal panels 18R, 18G, and 18B with substantially uniform brightness.

A polarization conversion element 13 converts the light from the second optical integration lens 12 into predetermined linearly polarized light. The superimposing lens 14 superimposes the images of the lens elements of the first optical integration lens 11 having passed through the second optical integration lens 12 on the display areas of the liquid crystal panels 18R, 18G, and 18B.

A first dichroic mirror 15 reflects R light and transmits G light and B light incident thereon from the superimposing lens 14. The R light reflected off the first dichroic mirror 15 travels along a reflection mirror 16 and a field lens 17R and impinges on the liquid crystal panel 18R, which is a light modulation device. The liquid crystal panel 18R modulates the R light in accordance with an image signal to form an R image.

A second dichroic mirror 21 reflects the G light and transmits the B light having passed through the first dichroic mirror 15. The G light reflected off the second dichroic mirror 21 passes through a field lens 17G and impinges on the liquid crystal panel 18G, which is a light modulation device. The liquid crystal panel 18G modulates the G light in accordance with an image signal to form a G image. The B light having passed through the second dichroic mirror 21 travels along relay lenses 22 and 24, reflection mirrors 23 and 25, and a field lens 17B and impinges on the liquid crystal panel 18B, which is a light modulation device. The liquid crystal panel 18B modulates the B light in accordance with an image signal to form a B image.

A cross dichroic prism 19, which is a light combining prism, combines the light fluxes modulated by the liquid crystal panels 18R, 18G, and 18B into image light and directs the image light to a projection zoom lens 40.

The projection zoom lens 40 enlarges and projects the image light produced by the cross dichroic prism 19 that combines the light fluxes modulated by the liquid crystal panels 18G, 18R, and 18B on a screen (not shown).

The circuit apparatus 80 includes an image processor 81 to which a video signal or any other external image signal is inputted, a display driver 82 that drives the liquid crystal panels 18G, 18R, and 18B provided in the optical system portion 50 based on outputs from the image processor 81, a lens driver 83 that operates drive mechanisms (not shown) provided in the projection zoom lens 40 to adjust the state of the projection zoom lens 40, and a main controller 88 that oversees and controls the operation of the circuit portions 81, 82 and 83 and other components.

The image processor 81 converts an inputted external image signal into color image signals containing grayscales and other parameters. The image processor 81 can also perform distortion correction, color correction, and a variety of other types of image processing on the external image signal.

The display driver 82 can operate the liquid crystal panels 18G, 18R, and 18B based on the image signals outputted from the image processor 81 to allow the liquid crystal panels 18G, 18R, and 18B to form images corresponding to the image signals or images corresponding to the image signals having undergone image processing.

The lens driver 83, which operates under the control of the main controller 88, can move part of the optical elements that form the projection zoom lens 40 along an optical axis OA as appropriate to change the magnification at which the projection zoom lens 40 projects an image on the screen. Further, the lens driver 83 can change the vertical position of an image projected on the screen by performing tilt adjustment that moves the entire projection zoom lens 40 in the vertical direction perpendicular to the optical axis OA.

Figures 2A, 2B:
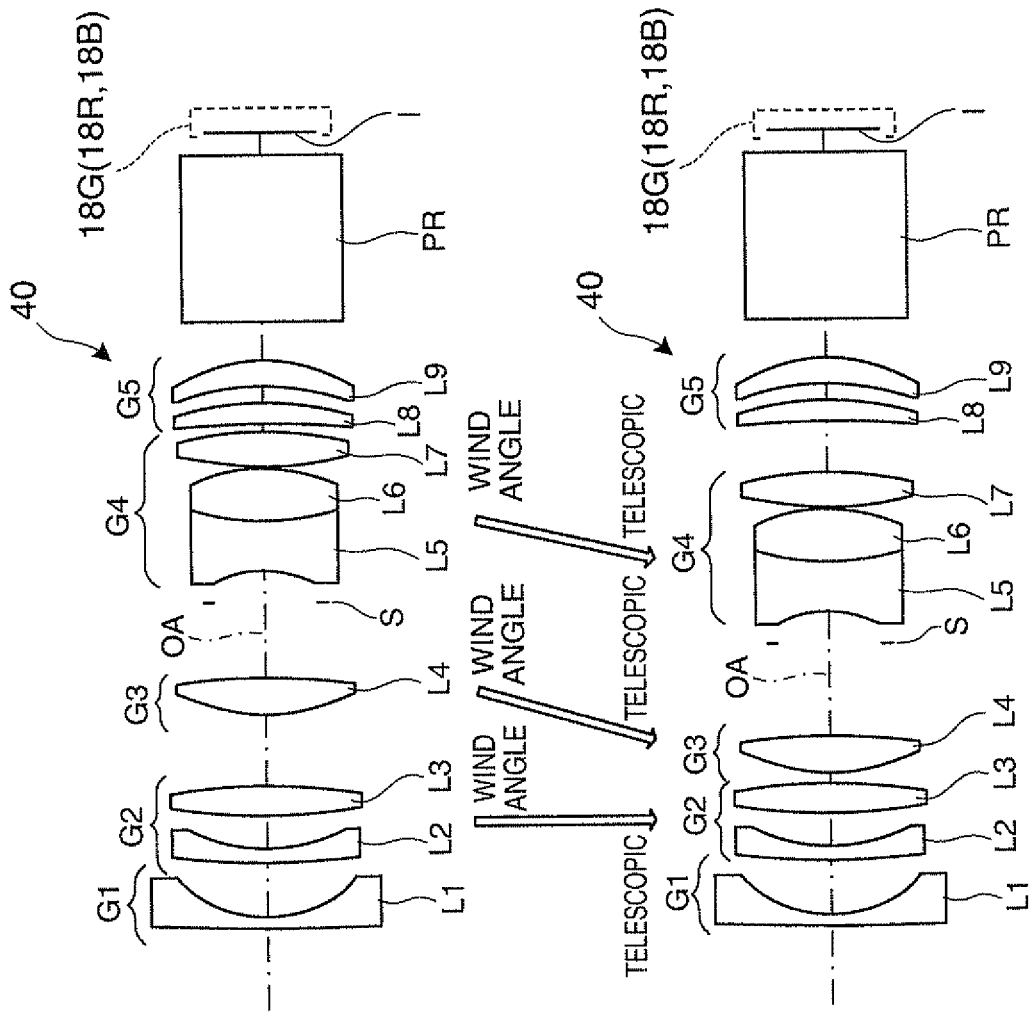
FIGS. 2A and 2B are cross-sectional views for describing the structure of the projection zoom lens incorporated into the projector.

The projection zoom lens 40 according to the embodiment will be specifically described below with reference to FIGS. 2A and 2B and other figures. The projection zoom lens 40 illustrated in FIG. 2A and other figures has the same configuration as that of a projection zoom lens 40 according to Example 2, which will be described later.

The projection zoom lens 40 according to the embodiment is formed of the following lens groups sequentially arranged from the high magnification side: a first lens group G1 fixed at the time of zooming and having negative power; a second lens group G2 moved along the optical axis OA at the time of zooming and having negative power; a third lens group G3 moved at the time of zooming and having positive power; a fourth lens group G4 moved at the time of zooming; and a fifth lens group G5 fixed at the time of zooming and having positive power. The second to fourth lens groups G2 to G4 moved at the time of zooming form movable lens groups, and the fifth lens group G5 fixed at the time of zooming corresponds to a last lens group. The first lens group G1 includes only a single lens L1. The second lens group G2 includes, for example, two lenses L2 and L3. The third lens group G3 includes, for example, a single lens L4. The fourth lens group G4 includes, for example, a doublet formed of lenses L5 and L6 and a single lens L7. The fifth lens group G5 includes, for example, two lenses L8 and L9. The projection zoom lens 40 further includes an aperture stop S between a certain pair of the movable lens groups, specifically, between the third lens group G3 and the fourth lens group G4. The projection zoom lens 40 projects an image formed on a projected surface 1 of the liquid crystal panel 18G (18R, 18B) on the screen (not shown). A prism PR corresponding to the cross dichroic prism 19 shown in FIG. 1 is disposed between the projection zoom lens 40 and the liquid crystal panel 18G (18R, 18B).

A description will now be made of zooming. When a wide angle end state shown in FIG. 2A is changed to a telescopic end state shown in FIG. 2B, the third lens group G3, the fourth lens group G4, and other lens groups are moved along the optical axis OA toward the high magnification side. On the other hand, to bring a subject into focus, only the first lens group G1 is moved along the optical axis OA.

The projection zoom lens 40 satisfies the conditional expression (1) having been described above. That is, when the total lens system has a focal length Fw at the wide angle end and the first lens group G1 has a focal length F1, the projection zoom lens 40 satisfies the following conditional expression.

$$-0.5 < Fw/F1 < -0.1 \quad (1)$$

The projection zoom lens 40 according to the embodiment is a retrofocus-type projection lens, in which a lens group having large negative power is disposed on the high magnification side to provide a long back focal length. When the lens group having large negative power is divided into a negative first lens group G1 and a negative second lens group G2, the first lens group G1 disposed on the enlargement side can be simplified, and the size and weight of a frame structure of the first lens group G1 for focusing can be reduced. As a result, the overall size and weight of the projection zoom lens 40 can be readily reduced.

The conditional expression (1) defines a condition on the power of the first lens group G1. When Fw/F1 is greater than the upper limit of the conditional expression (1) and the absolute value of the negative power of the first lens group G1 becomes too small, the travel required in focusing operation is too long, which is not preferable. Conversely, when Fw/F1 is smaller than the lower limit of the conditional expression (1) and the absolute value of the negative power of the first lens group G1 becomes too large, the low-magnification-side surface in particular has too small a radius of curvature, which makes it difficult to correct astigmatism and distortion in a well balanced manner.

The thus configured projection zoom lens 40 further satisfies the conditional expression (2) having been described as well as the conditional expression (1) described above. That is, when the third lens group G3 has a focal length F3, the projection zoom lens 40 satisfies the following conditional expression.

$$0.05 < Fw/F3 < 0.45 \quad (2)$$

The thus configured projection zoom lens 40 further satisfies the conditional expression (3) having been described as well as the conditional expression (1) and others described above. That is, when the fifth lens group G5, which is the last lens group, has a focal length FL, the projection zoom lens 40 satisfies the following conditional expression.

$$0.2 < Fw/FL < 0.4 \quad (3)$$

The thus configured projection zoom lens 40 includes two resin lenses having oppositely signed power factors, a resin lens having negative power and disposed on the high magnification side with respect to the aperture stop S (lens L2 in second lens group G2, for example) and a resin lens having positive power and disposed on the low magnification side with respect to the aperture stop S (lens L8 in fifth lens group G5, for example). The thus combined two lenses L2 and L8 having oppositely signed power factors can function as lenses that cancel the amounts of focus change produced thereby with each other. The projection zoom lens 40 further satisfies the conditional expression (4) having been described as well as the conditional expression (1) and others described above. That is, when the resin lens having negative power (lens L2, for example) has a power φn and the resin lens having positive power (lens L8, for example) has a power φp, the projection zoom lens 40 satisfies the following conditional expression.

$$-0.02 < \phi p + \phi n < 0 \quad (\phi = 1/f) \quad (4)$$

The resin lens having positive power and the resin lens having negative power incorporated in the projection zoom lens 40 are not necessarily disposed on opposite sides of the aperture stop S but can be disposed, for example, on the high magnification side with respect to the aperture stop S. In this case, the two resin lenses having oppositely signed power factors can be disposed adjacent to each other or on opposite sides of another lens in a single lens group or can be disposed in lens groups disposed adjacent to each other or in lens groups on opposite sides of another lens group.

The number of lens groups that form the projection zoom lens 40 is not limited to five but can be six.

EXAMPLES

Specific examples of the projection zoom lens 40 will be described below. The meanings of a variety of parameters common to Examples 1 to 7, which will be described below, are summarized as follows.

R Radius of curvature
D On-axis inter-surface distance (thickness of lens or distance between lenses)
nd Refractive index at d line
vd Abbe number at d line
dn/dt Temperature coefficient of refractive index
α Coefficient of linear expansion
Fno f-number
F Focal length of total lens system
ω Half angle of view An aspheric surface is expressed by the following polynomial (expression of aspheric surface).

$$z = \frac{ch^2}{1 + \sqrt{1 - (k+1)c^2 h^2}} + A_4 h^4 + A_6 h^6 + A_8 h^8 + A_{10} h^{10} + A_{12} h^{12}$$

The parameters in the polynomial are as follows:
c Curvature (1/R)
h Height from optical axis
k Conical coefficient of aspheric surface
Ai Higher-order aspheric coefficient of aspheric surface Example 1

Table 1 shown below summarizes overall characteristics of a projection zoom lens according to Example 1. In Table 1, "Wide," "Middle," and "Tele" stand for the wide angle end, the middle position, and the telescopic end, respectively.

TABLE 1

|  | Wide | Middle | Tele |
|---|---|---|---|
| FNo | 1.58 | 1.62 | 1.67 |
| F | 14.37 | 15.80 | 17.24 |
| ω | 30.6° | 28.0° | 26.1° |

Table 2 shown below shows data on the lens surfaces in Example 1. ST stands for the aperture stop S. A surface having a surface number followed by "*" is a surface having an aspheric shape.

TABLE 2

| Surface number | R | D | nd | vd |
|---|---|---|---|---|
| 0 |  | D0 |  |  |
| 1 | 48.694 | 1.80 | 1.62299 | 58.20 |
| 2 | 17.749 | D2 |  |  |
| 3* | 45.000 | 2.20 | 1.51633 | 64.10 |
| 4* | 16.332 | 7.83 |  |  |
| 5 | 33.720 | 4.00 | 1.80518 | 25.40 |
| 6 | 98.124 | D6 |  |  |
| 7 | 36.887 | 5.60 | 1.72342 | 38.00 |
| 8 | −24.965 | 1.20 | 1.69895 | 30.10 |
| 9 | −777.034 | D9 |  |  |
| ST | 1.00E+18 | 8.27 |  |  |
| 11 | −14.560 | 1.60 | 1.80518 | 25.40 |
| 12 | 122.854 | 0.80 |  |  |
| 13 | −98.298 | 4.00 | 1.58913 | 61.10 |
| 14* | −21.542 | 1.13 |  |  |
| 15 | −2909.418 | 6.20 | 1.51633 | 64.10 |
| 16 | −17.032 | D16 |  |  |
| 17 | 34.290 | 5.00 | 1.58913 | 61.10 |
| 18 | −133.479 | 6.00 |  |  |
| 19 | 1.00E+18 | 25.75 | 1.51633 | 64.10 |
| 20 | 1.00E+18 | 3.35 |  |  |

In Table 2 and the following tables, 10 raised to some power ($1.00 \times 10^{+18}$, for example) is expressed by using E (1.00E+18, for example).

Table 3 shown below shows aspheric coefficients of the lens surfaces in Example 1.

TABLE 3

Third surface

K = 0.0000, A04 = −3.0644E−08, A06 = 0.0000E+00,
A08 = 0.0000E+00, A10 = 0.0000E+00, A12 = 0.0000E+00
Fourth surface K = −0.5769, A04 = −1.9978E−05, A06 = −3.7924E−08,
A08 = −6.7160E−11, A10 = −1.4970E−13, A12 = 0.0000E+00
Fourteenth surface K = 0.0000, A04 = 1.9114E−05, A06 = 7.0588E−08,
A08 = 2.3160E−10, A10 = 0.0000E+00, A12 = 0.0000E+00

Table 4 shown below shows variable distances D0, D2, D6, D9, and D16 in Table 2 at the wide angle end (Wide), the middle position (Middle), and the telescopic end (Tele).

TABLE 4

|  | Wide | Middle | Tele |
|---|---|---|---|
| D0 | 1800.00 | 1800.00 | 1800.00 |
| D2 | 8.29 | 7.27 | 7.97 |
| D6 | 16.29 | 12.13 | 6.75 |
| D9 | 7.08 | 8.89 | 9.74 |
| D16 | 1.00 | 4.06 | 7.88 |

FIG. 3A is a cross-sectional view of the projection zoom lens according to Example 1 operating at the wide angle end, and FIG. 3B is a cross-sectional view of the projection zoom lens according to Example 1 operating at the telescopic end. The projection zoom lens, which enlarges and projects an image formed on each projected surface I at a variable magnification, includes a first lens group G1 having negative power, a second lens group G2 having negative power, a third lens group G3 having positive power, an aperture stop S, a fourth lens group G4 having positive power, and a fifth lens group G5 having positive power sequentially arranged from the high magnification side. To change the magnification, the first lens group G1 and the fifth lens group (last lens group) G5 are fixed and the third lens group G3, the fourth lens group G4, and other lens groups, which are movable lens groups, are moved for zooming, and to bring a subject into focus, the first lens group G1 is moved for focusing.

The first lens group G1 includes a single lens, that is, a negative meniscus lens L1 having a convex surface facing the high magnification side. The second lens group G2 is formed of the following two lenses: a negative meniscus lens L2 having an aspheric surface on both sides one of which is a convex surface facing the high magnification side; and a positive meniscus lens L3 having a convex surface facing the high magnification side. The third lens group G3 includes a doublet formed of a biconvex positive lens L4 and a negative meniscus lens L5 having a convex surface facing the low magnification side. The fourth lens group G4 is formed of the following three lenses: a biconcave negative lens L6; a positive meniscus lens L7 having an aspheric convex surface facing the low magnification side; and a positive meniscus lens L8 having a convex surface facing the low magnification side. The fifth lens group G5 is formed of a single lens, that is, a biconvex positive lens L9.

Figure 4A:
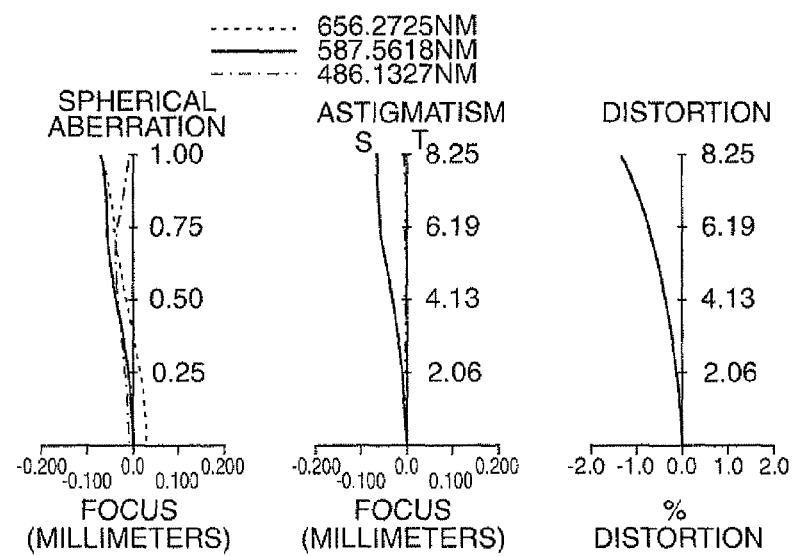
FIGS. 4A to 4C show aberrations produced by the zoom lens according to Example 1.
Figure 4B:
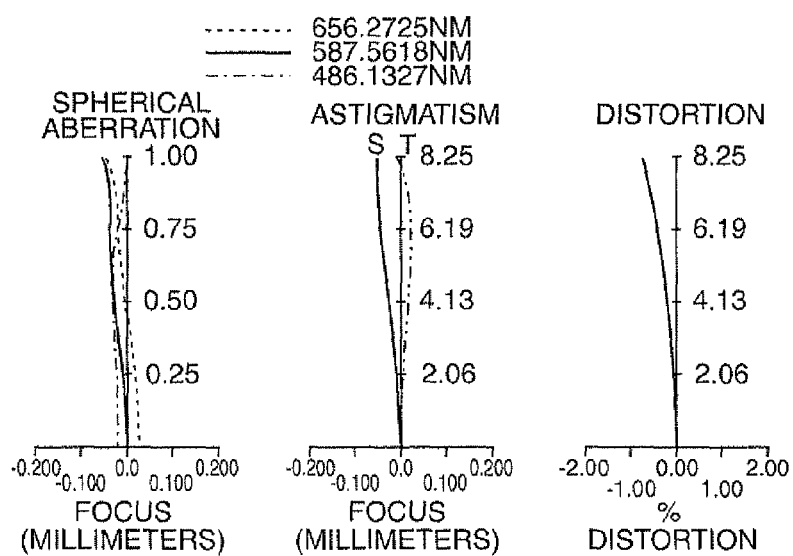
Figure 4C:
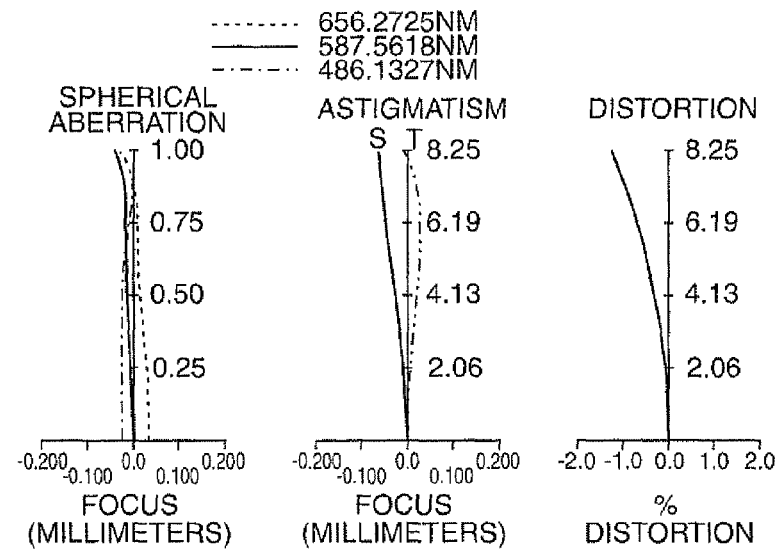

FIG. 4A shows aberrations (spherical aberration, astigmatism, and distortion) produced by the projection zoom lens 41 according to Example 1 operating at the wide angle end. FIG. 4B shows aberrations (spherical aberration, astigmatism, and distortion) produced by the projection zoom lens 41 according to Example 1 operating at the middle position. FIG. 4C shows aberrations (spherical aberration, astigmatism, and distortion) produced by the projection zoom lens 41 according to Example 1 operating at the telescopic end.

Example 2

Table 5 shown below summarizes overall characteristics of a projection zoom lens according to Example 2.

TABLE 5

|  | Wide | Middle | Tele |
|---|---|---|---|
| FNo | 1.58 | 1.64 | 1.72 |
| F | 14.37 | 15.80 | 17.24 |
| ω | 30.5° | 27.8° | 25.7° |

Table 6 shown below shows data on the lens surfaces in Example 2.

TABLE 6

| Surface number | R | D | nd | vd | dn/dt (×10$^{-6}$) | α (×10$^{-7}$) |
|---|---|---|---|---|---|---|
| 0 |  | D0 |  |  |  |  |
| 1 | 1579.866 | 1.50 | 1.51633 | 64.1 | 1.5 | 73.0 |
| 2 | 18.369 | D2 |  |  |  |  |
| 3* | 126.692 | 2.00 | 1.53116 | 56.0 | −108.0 | 700.0 |
| 4* | 21.315 | 5.34 |  |  |  |  |
| 5 | 135.807 | 4.50 | 1.80518 | 25.4 | 1.2 | 90.3 |
| 6 | −70.941 | D6 |  |  |  |  |
| 7 | 29.531 | 5.60 | 1.51633 | 64.1 | 1.5 | 73.0 |
| 8 | −102.428 | D8 |  |  |  |  |
| ST | 1.00E+18 | 4.80 |  |  |  |  |
| 10 | −16.750 | 8.00 | 1.72825 | 28.5 | 2.8 | 81.2 |
| 11 | 43.545 | 8.00 | 1.51633 | 64.1 | 1.5 | 73.0 |
| 12 | −24.464 | 0.16 |  |  |  |  |

TABLE 6-continued

| Surface number | R | D | nd | vd | dn/dt (×10$^{-6}$) | α (×10$^{-7}$) |
|---|---|---|---|---|---|---|
| 13 | 47.483 | 5.60 | 1.51633 | 64.1 | 1.5 | 73.0 |
| 14 | −47.483 | D14 |  |  |  |  |
| 15* | −2821.897 | 3.40 | 1.53116 | 56.0 | −108.0 | 700.0 |
| 16* | −40.786 | 2.50 |  |  |  |  |
| 17 | −36.443 | 4.00 | 1.51633 | 64.1 | 1.5 | 73.0 |
| 18 | −24.428 | 6.00 |  |  |  |  |
| 19 | 1.00E+18 | 25.75 | 1.51680 | 64.2 | 2.3 | 73.0 |
| 20 | 1.00E+18 | 3.35 |  |  |  |  |

Table 7 shown below shows aspheric coefficients of the lens surfaces in Example 2.

TABLE 7

| Third surface |
|---|
| K = −1.0000, A04 = −6.7668E−06, A06 = 0.0000E+00, A08 = 0.0000E+00, A10 = 0.0000E+00, A12 = 0.0000E+00 |
| Fourth surface |
| K = 0.0000, A04 = −4.3652E−05, A06 = −3.1832E−08, A08 = 7.5513E−11, A10 = −3.7611E−13, A12 = 0.0000E+00 |
| Fifteenth surface |
| K = 0.0000, A04 = −1.2688E−05, A06 = 0.0000E+00, A08 = 0.0000E+00, A10 = 0.0000E+00, A12 = 0.0000E+00 |
| Sixteenth surface |
| K = −1.0000, A04 = 7.7793E−06, A06 = 5.4567E−09, A08 = 2.3541E−11, A10 = 0.0000E+00, A12 = 0.0000E+00 |

Table 8 shown below shows variable distances D0, D2, D6, D8, and D14 in Table 6 at the wide angle end (Wide), the middle position (Middle), and the telescopic end (Tele).

TABLE 8

|  | Wide | Middle | Tele |
|---|---|---|---|
| D0 | 1800.00 | 1800.00 | 1800.00 |
| D2 | 8.65 | 8.43 | 8.79 |
| D6 | 10.84 | 6.11 | 1.50 |
| D8 | 11.76 | 13.35 | 14.25 |
| D14 | 1.00 | 4.23 | 7.85 |

FIG. 5A is a cross-sectional view of the projection zoom lens 42 according to Example 2 operating at the wide angle end, and FIG. 5B is a cross-sectional view of the projection zoom lens 42 according to Example 2 operating at the telescopic end. The projection zoom lens 42, which enlarges and projects an image formed on each projected surface I at a variable magnification, includes a first lens group G1 having negative power, a second lens group G2 having negative power, a third lens group G3 having positive power, an aperture stop S, a fourth lens group G4 having positive power, and a fifth lens group G5 having positive power sequentially arranged from the high magnification side. To change the magnification, the first lens group G1 and the fifth lens group (last lens group) G5 are fixed and the third lens group G3, the fourth lens group G4, and other lens groups, which are movable lens groups, are moved for zooming, and to bring a subject into focus, the first lens group G1 is moved for focusing.

The first lens group G1 includes a single lens, that is, a negative meniscus lens L1 having a convex surface facing the high magnification side. The second lens group G2 is formed of the following two lenses: a negative meniscus lens L2 having an aspheric surface on both sides one of which is a convex surface facing the high magnification side; and a biconvex positive lens L3. The third lens group G3 includes a single lens, that is, a biconvex positive lens L4. The fourth lens group G4 is formed of the following three lenses: a doublet formed of a biconcave negative lens L5 and a biconvex positive lens L6; and a biconvex positive lens L7. The fifth lens group G5 is formed of the following two lenses: a positive meniscus lens L8 having an aspheric surface on both sides one of which is a convex surface facing the low magnification side; and a positive meniscus lens L9 having a convex surface facing the low magnification side.

The negative meniscus lens L2 in the second lens group G2 and the positive meniscus lens L8 in the fifth lens group G5 are resin lenses, which means that two resin lenses having oppositely signed power factors are disposed on opposite sides of the aperture stop S.

Figure 6A:
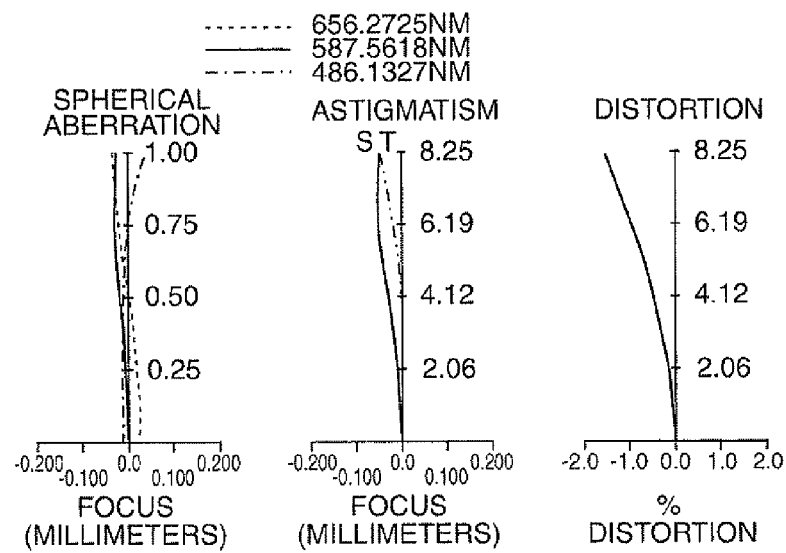
FIGS. 6A to 6C show aberrations produced by the zoom lens according to Example 2.
Figure 6B:
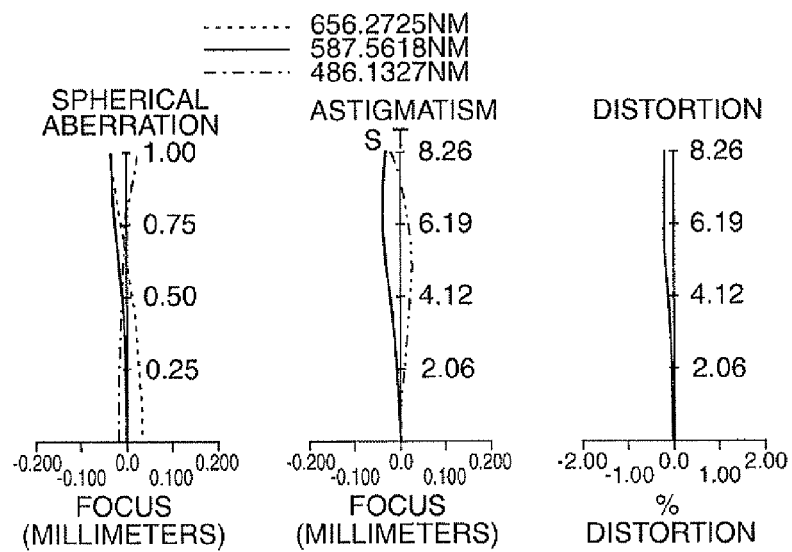
Figure 6C:
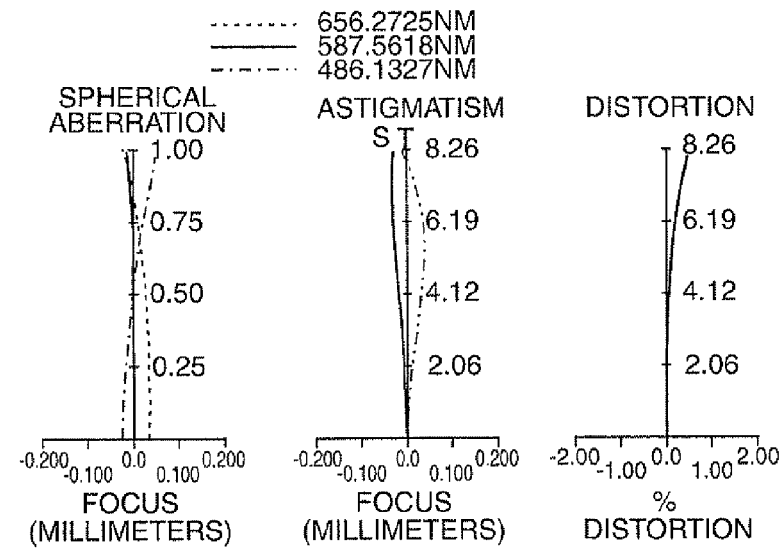

FIG. 6A shows aberrations (spherical aberration, astigmatism, and distortion) produced by the projection zoom lens 42 according to Example 2 operating at the wide angle end. FIG. 6B shows aberrations (spherical aberration, astigmatism, and distortion) produced by the projection zoom lens 42 according to Example 2 operating at the middle position. FIG. 6C shows aberrations (spherical aberration, astigmatism, and distortion) produced by the projection zoom lens 42 according to Example 2 operating at the telescopic end.

Example 3

Table 9 shown below summarizes overall characteristics of a projection zoom lens according to Example 3.

TABLE 9

|  | Wide | Middle | Tele |
|---|---|---|---|
| FNo | 1.58 | 1.64 | 1.70 |
| F | 14.37 | 15.80 | 17.24 |
| ω | 30.5° | 28.1° | 26.2° |

Table 10 shown below shows data on the lens surfaces in Example 3.

TABLE 10

| Surface number | R | D | nd | vd | dn/dt (×10$^{-6}$) | α (×10$^{-7}$) |
|---|---|---|---|---|---|---|
| 0 |  | D0 |  |  |  |  |
| 1 | 63.286 | 1.50 | 1.51633 | 64.1 | 1.5 | 73.0 |
| 2 | 17.588 | D2 |  |  |  |  |
| 3* | 64.947 | 2.00 | 1.53116 | 56.0 | −108.0 | 700.0 |
| 4* | 16.122 | 14.37 |  |  |  |  |
| 5 | 47.467 | 3.20 | 1.80518 | 25.4 | 1.2 | 90.3 |
| 6 | 185.065 | D6 |  |  |  |  |
| 7 | 42.687 | 3.60 | 1.72000 | 50.2 | 5.4 | 62.1 |
| 8 | −121.438 | D8 |  |  |  |  |
| ST | 1.00E+18 | 5.58 |  |  |  |  |
| 10 | −22.300 | 3.50 | 1.51633 | 64.1 | 1.5 | 73.0 |
| 11 | −17.476 | 1.20 | 1.84666 | 23.8 | 1.3 | 89.1 |
| 12 | 282.531 | 3.57 |  |  |  |  |
| 13 | 52.195 | 5.20 | 1.58913 | 61.1 | 3.8 | 57.7 |
| 14 | −29.560 | 5.29 |  |  |  |  |
| 15* | −837.657 | 3.40 | 1.53116 | 56.0 | −108.0 | 700.0 |
| 16* | −47.831 | D16 |  |  |  |  |
| 17 | 33.336 | 4.60 | 1.51633 | 64.1 | 1.5 | 73.0 |
| 18 | −116.582 | 6.00 |  |  |  |  |
| 19 | 1.00E+18 | 25.75 | 1.51680 | 64.2 | 2.3 | 73.0 |
| 20 | 1.00E+18 | 3.35 |  |  |  |  |

Table 11 shown below shows aspheric coefficients of the lens surfaces in Example 3.

TABLE 11

Third surface

K = −1.0000, A04 = −3.4529E−06, A06 = −2.1519E−09,
A08 = 0.0000E+00, A10 = 0.0000E+00, A12 = 0.0000E+00
Fourth surface K = 0.0000, A04 = −4.2637E−05, A06 = −1.3813E−07,
A08 = 3.0798E−10, A10 = −2.3358E−12, A12 = 0.0000E+00
Fifteenth surface K = −1.0000, A04 = 9.1030E−06, A06 = 9.7872E−08,
A08 = 8.6880E−11, A10 = −3.0883E−13, A12 = 0.0000E+00
Sixteenth surface K = −20.2023, A04 = 1.1758E−06, A06 = 1.7790E−07,
A08 = 0.0000E+00, A10 = 0.0000E+00, A12 = 0.0000E+00

Table 12 shown below shows variable distances D0, D2, D6, D8, and D16 in Table 10 at the wide angle end (Wide), the middle position (Middle), and the telescopic end (Tele).

TABLE 12

|  | Wide | Middle | Tele |
|---|---|---|---|
| D0 | 1800.00 | 1800.00 | 1800.00 |
| D2 | 7.41 | 7.64 | 7.33 |
| D6 | 10.91 | 5.36 | 1.50 |
| D8 | 12.04 | 13.08 | 13.80 |
| D16 | 1.00 | 4.95 | 8.69 |

FIG. 7A is a cross-sectional view of the projection zoom lens 43 according to Example 3 operating at the wide angle end, and FIG. 7E is a cross-sectional view of the projection zoom lens 43 according to Example 3 operating at the telescopic end. The projection zoom lens 43, which enlarges and projects an image formed on each projected surface 1 at a variable magnification, includes a first lens group G1 having negative power, a second lens group G2 having negative power, a third lens group G3 having positive power, an aperture stop S, a fourth lens group G4 having positive power, and a fifth lens group G5 having positive power sequentially arranged from the high magnification side. To change the magnification, the first lens group G1 and the fifth lens group (last lens group) G5 are fixed and the third lens group G3, the fourth lens group G4, and other lens groups, which are movable lens groups, are moved for zooming, and to bring a subject into focus, the first lens group G1 is moved for focusing.

The first lens group G1 includes a single lens, that is, a negative meniscus lens L1 having a convex surface facing the high magnification side. The second lens group G2 is formed of the following two lenses: a negative meniscus lens L2 having an aspheric surface on both sides one of which is a convex surface facing the high magnification side; and a positive meniscus lens L3 having a convex surface facing the high magnification side. The third lens group G3 includes a single lens, that is, a biconvex positive lens L4. The fourth lens group G4 is formed of the following four lenses: a doublet formed of a positive meniscus lens L5 having a convex surface facing the low magnification side and a biconcave negative lens L6; a biconvex positive lens L7; and a positive meniscus lens L8 having an aspheric surface on both sides one of which is a convex surface facing the low magnification side. The fifth lens group G5 includes a single lens, that is, a biconvex positive lens L9.

The negative meniscus lens L2 in the second lens group G2 and the positive meniscus lens L8 in the fourth lens group G4 are resin lenses, which means that two resin lenses having oppositely signed power factors are disposed on opposite sides of the aperture stop S.

Figure 8A:
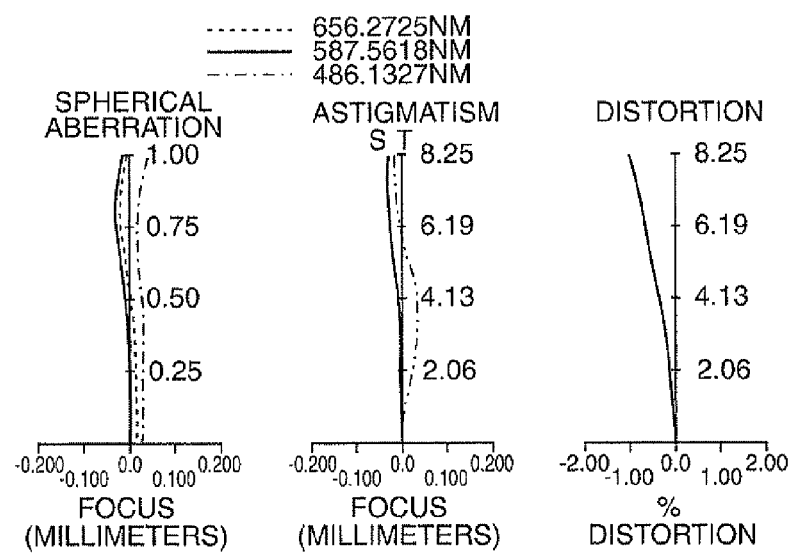
FIGS. 8A to 8C show aberrations produced by the zoom lens according to Example 3.
Figure 8B:
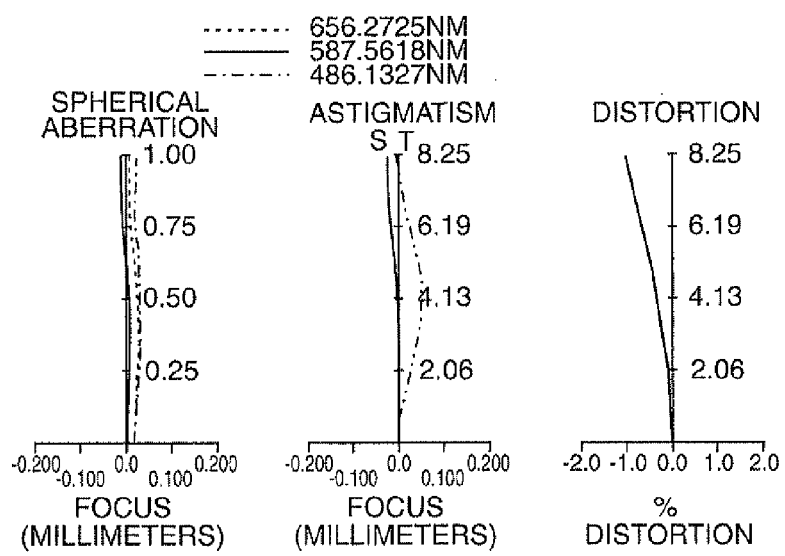
Figure 8C:
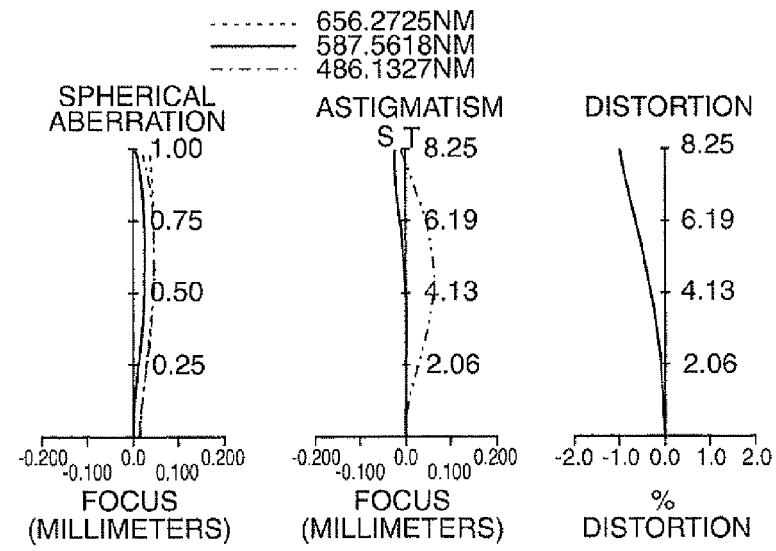

FIG. 8A shows aberrations (spherical aberration, astigmatism, and distortion) produced by the projection zoom lens 43 according to Example 3 operating at the wide angle end. FIG. 8B shows aberrations (spherical aberration, astigmatism, and distortion) produced by the projection zoom lens 43 according to Example 3 operating at the middle position. FIG. 8C shows aberrations (spherical aberration, astigmatism, and distortion) produced by the projection zoom lens 43 according to Example 3 operating at the telescopic end.

Example 4

Table 13 shown below summarizes overall characteristics of a projection zoom lens according to Example 4.

TABLE 13

|  | Wide | Middle | Tele |
|---|---|---|---|
| FNo | 1.58 | 1.63 | 1.72 |
| F | 14.37 | 15.80 | 17.24 |
| ω | 30.5° | 27.9° | 25.9° |

Table 14 shown below shows data on the lens surfaces in Example 4.

TABLE 14

| Surface number | R | D | nd | vd | dn/dt ($\times 10^{-6}$) | α ($\times 10^{-7}$) |
|---|---|---|---|---|---|---|
| 0 |  | D0 |  |  |  |  |
| 1 | 66.661 | 1.50 | 1.51633 | 64.1 | 1.5 | 73.0 |
| 2 | 15.710 | D2 |  |  |  |  |
| 3* | 63.354 | 2.00 | 1.53116 | 56.0 | −108.0 | 700.0 |
| 4* | 16.412 | 10.92 |  |  |  |  |
| 5* | 26.397 | 3.60 | 1.60737 | 27.0 | −108.0 | 700.0 |
| 6 | 75.599 | D6 |  |  |  |  |
| 7 | 33.612 | 5.50 | 1.51633 | 64.1 | 1.5 | 73.0 |
| 8 | −69.522 | D8 |  |  |  |  |
| ST | 1.00E+18 | 5.58 |  |  |  |  |
| 10* | −25.036 | 4.15 | 1.58913 | 61.1 | 3.8 | 57.7 |
| 11 | −16.786 | 1.20 | 1.84666 | 23.8 | 1.3 | 89.1 |
| 12 | 306.451 | 3.63 |  |  |  |  |
| 13 | −185.652 | 5.60 | 1.65844 | 50.9 | 4.3 | 68.0 |
| 14 | −20.366 | 2.10 |  |  |  |  |
| 15 | −68.197 | 3.40 | 1.51633 | 64.1 | 1.5 | 73.0 |
| 16 | −29.072 | D16 |  |  |  |  |
| 17 | 32.196 | 5.00 | 1.51633 | 64.1 | 1.5 | 73.0 |
| 18 | −236.950 | 6.00 |  |  |  |  |
| 19 | 1.00E+18 | 25.75 | 1.51680 | 64.2 | 2.3 | 73.0 |
| 20 | 1.00E+18 | 3.35 |  |  |  |  |

Table 15 shown below shows aspheric coefficients of the lens surfaces in Example 4.

TABLE 15

| Third surface |
|---|
| K = −1.0000, A04 = −9.9490E−07, A06 = 0.0000E+00, A08 = 0.0000E+00, A10 = 0.0000E+00, A12 = 0.0000E+00 |
| Fourth surface |
| K = 0.0000, A04 = −5.7861E−05, A06 = −1.4664E−07, A08 = 4.4497E−10, A10 = −2.9370E−12, A12 = 0.0000E+00 |
| Fifth surface |
| K = 0.0000, A04 = −1.2189E−05, A06 = −6.5361E−09, A08 = 0.0000E+00, A10 = 0.0000E+00, A12 = 0.0000E+00 |

TABLE 15-continued

| Tenth surface |
|---|
| K = 0.0000, A04 = −4.7803E−05, A06 = −1.2278E−07, A08 = 2.3968E−10, A10 = 0.0000E+00, A12 = 0.0000E+00 |

Table 16 shown below shows variable distances D0, D2, D6, D8, and D16 in Table 14 at the wide angle end (Wide), the middle position (Middle), and the telescopic end (Tele).

TABLE 16

|  | Wide | Middle | Tele |
|---|---|---|---|
| D0 | 1800.00 | 1800.00 | 1800.00 |
| D2 | 7.62 | 6.69 | 6.85 |
| D6 | 10.29 | 6.09 | 1.50 |
| D8 | 14.78 | 16.32 | 17.05 |
| D16 | 1.00 | 4.33 | 8.27 |

Figure 9A:
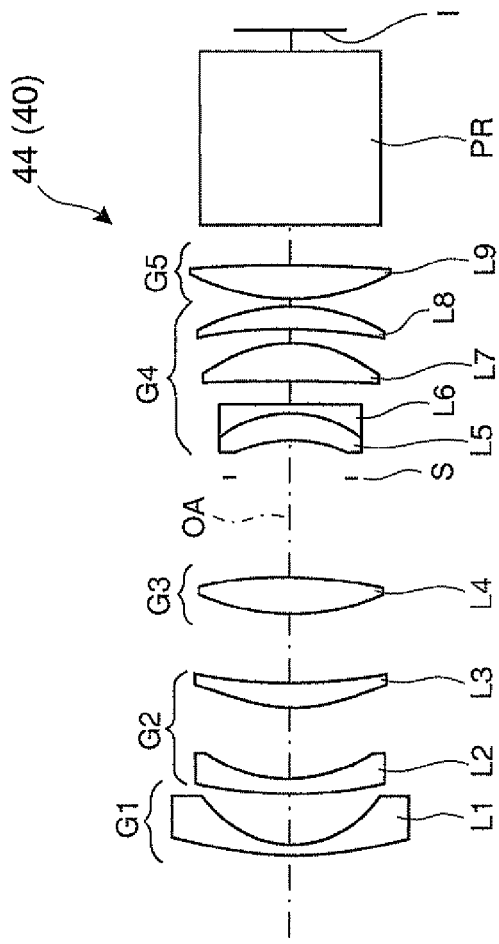
FIGS. 9A and 9B are cross-sectional views of a projection zoom lens according to Example 4.
Figure 9B:
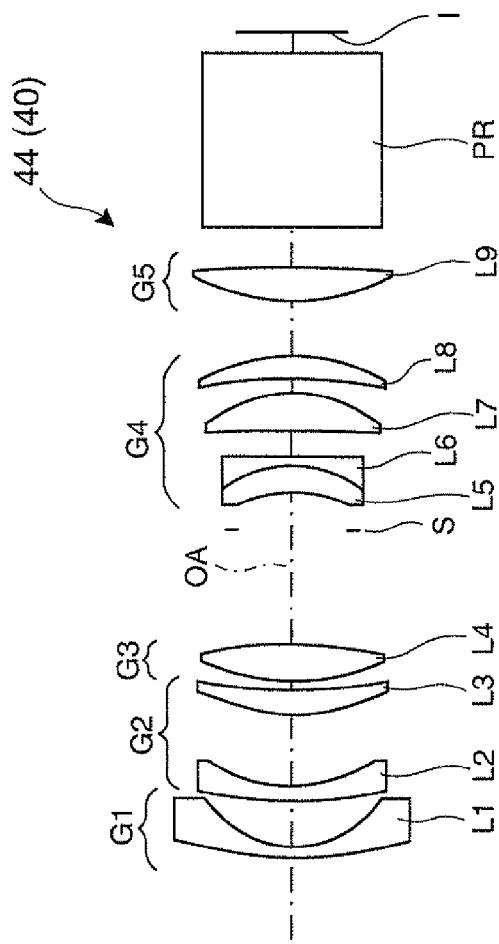

FIG. 9A is a cross-sectional view of the projection zoom lens 44 according to Example 4 operating at the wide angle end, and FIG. 9B is a cross-sectional view of the projection zoom lens 44 according to Example 4 operating at the telescopic end. The projection zoom lens 44, which enlarges and projects an image formed on each projected surface I at a variable magnification, includes a first lens group G1 having negative power, a second lens group G2 having negative power, a third lens group G3 having positive power, an aperture stop S, a fourth lens group G4 having positive power, and a fifth lens group G5 having positive power sequentially arranged from the high magnification side. To change the magnification, the first lens group G1 and the fifth lens group (last lens group) G5 are fixed and the third lens group G3, the fourth lens group G4, and other lens groups, which are movable lens groups, are moved for zooming, and to bring a subject into focus, the first lens group G1 is moved for focusing.

The first lens group G1 includes a single lens, that is, a negative meniscus lens L1 having a convex surface facing the high magnification side. The second lens group G2 is formed of the following two lenses: a negative meniscus lens L2 having an aspheric surface on both sides one of which is a convex surface facing the high magnification side; and a positive meniscus lens L3 having an aspheric convex surface facing the high magnification side. The third lens group G3 includes a single lens, that is, a biconvex positive lens L4. The fourth lens group G4 is formed of the following four lenses: a doublet formed of a positive meniscus lens L5 having an aspheric surface facing the high magnification side and a convex surface facing the low magnification side and a biconcave negative lens L6; a positive meniscus lens L7 having a convex surface facing the low magnification side; and a positive meniscus lens L8 having a convex surface facing the low magnification side. The fifth lens group G5 includes a single lens, that is, a biconvex positive lens L9.

The negative meniscus lens L2 and the positive meniscus lens L3 in the second lens group G2 are resin lenses, which means that two resin lenses having oppositely signed power factors are disposed adjacent to each other in a single lens group.

Figure 10A:
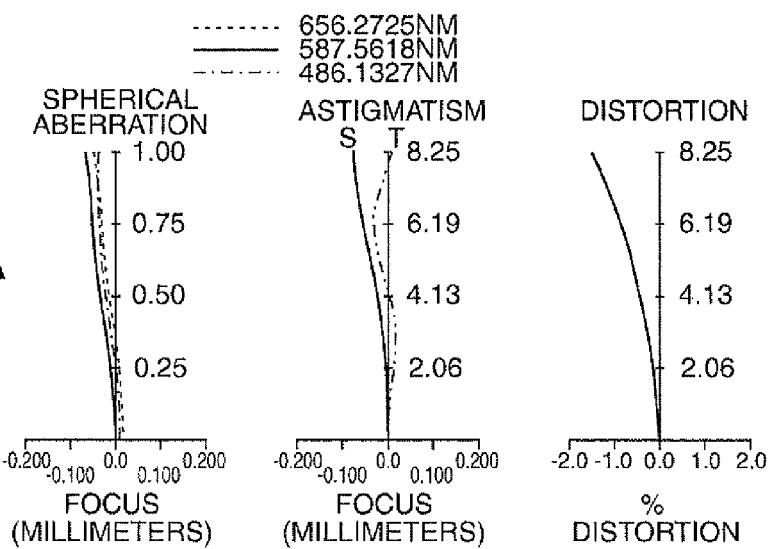
FIGS. 10A to 10C show aberrations produced by the zoom lens according to Example 4.
Figure 10B:
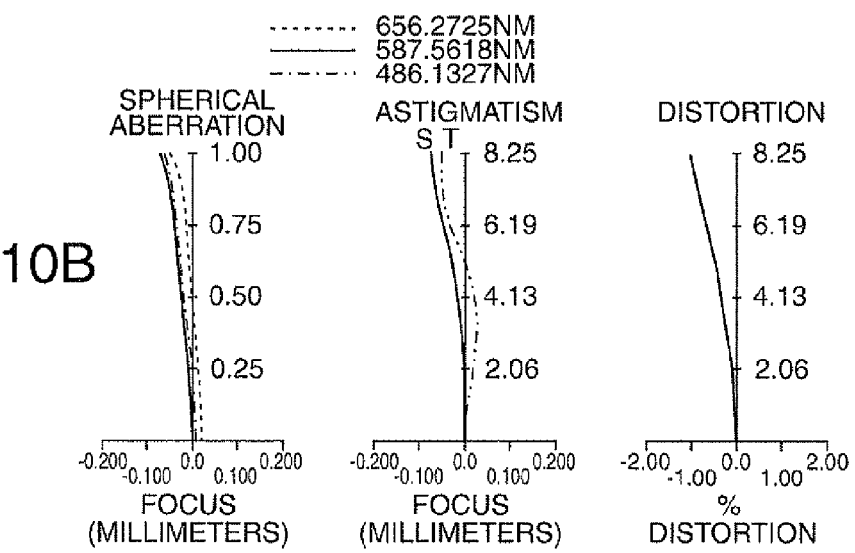
Figure 10C:
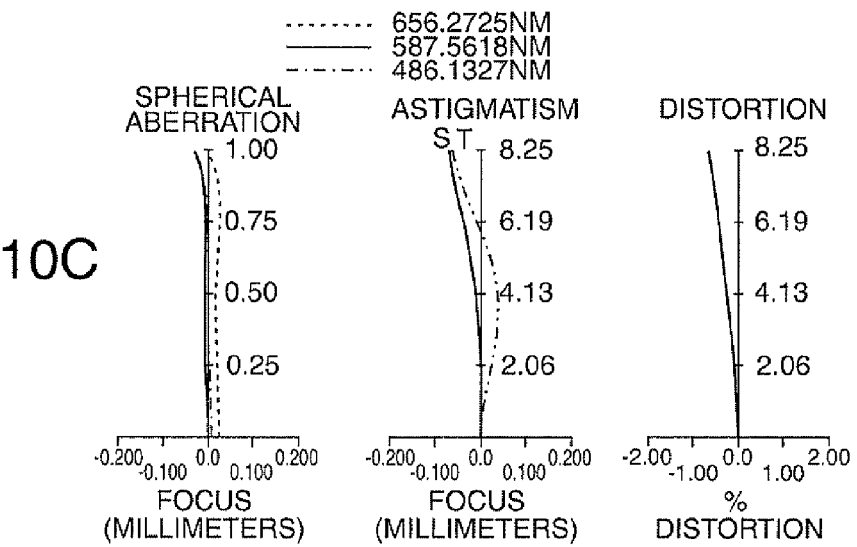

FIG. 10A shows aberrations (spherical aberration, astigmatism, and distortion) produced by the projection zoom lens 44 according to Example 4 operating at the wide angle end. FIG. 10B shows aberrations (spherical aberration, astigmatism, and distortion) produced by the projection zoom lens 44 according to Example 4 operating at the middle position. FIG.

10C shows aberrations (spherical aberration, astigmatism, and distortion) produced by the projection zoom lens 44 according to Example 4 operating at the telescopic end.

Example 5

Table 17 shown below summarizes overall characteristics of a projection zoom lens according to Example 5.

TABLE 17

|     | Wide  | Middle | Tele  |
| --- | ----- | ------ | ----- |
| FNo | 1.48  | 1.62   | 1.76  |
| F   | 13.65 | 17.70  | 21.90 |
| ω   | 31.7° | 25.3°  | 21.0° |

Table 18 shown below shows data on the lens surfaces in Example 5.

TABLE 18

| Surface number | R        | D     | nd      | vd   |
| -------------- | -------- | ----- | ------- | ---- |
| 0              |          | D0    |         |      |
| 1              | 54.358   | 2.00  | 1.69680 | 55.5 |
| 2              | 19.236   | D2    |         |      |
| 3              | 280.371  | 2.00  | 1.51633 | 64.2 |
| 4              | 32.791   | 0.10  | 1.51380 | 53.0 |
| 5*             | 25.800   | 8.08  |         |      |
| 6              | 611.830  | 3.40  | 1.84666 | 23.8 |
| 7              | −144.093 | D7    |         |      |
| 8              | 35.619   | 1.50  | 1.80518 | 25.4 |
| 9              | 21.382   | 5.50  | 1.80100 | 35.0 |
| 10             | 146.171  | D10   |         |      |
| 11*            | 39.527   | 3.60  | 1.74320 | 49.3 |
| 12             | 93.672   | D12   |         |      |
| ST             | 1.00E+18 | 7.00  |         |      |
| 14             | −15.620  | 1.20  | 1.80518 | 25.4 |
| 15             | 61.281   | 4.00  | 1.58642 | 60.8 |
| 16             | −33.694  | 2.18  |         |      |
| 17             | −84.079  | 6.40  | 1.74320 | 49.3 |
| 18*            | −20.156  | D18   |         |      |
| 19             | 46.235   | 5.00  | 1.69680 | 55.5 |
| 20             | −95.202  | 5.75  |         |      |
| 21             | 1.00E+18 | 25.75 | 1.51633 | 64.2 |
| 22             | 1.00E+18 | 3.00  |         |      |

Table 19 shown below shows aspheric coefficients of the lens surfaces in Example 5.

TABLE 19

Fifth surface

K = 0.0000, A04 = −2.1003E−05, A06 = −2.9904E−08,
A08 = 8.2811E−11, A10 = −3.2507E−13, A12 = 1.3138E−16

Eleventh surface

K = 0.0000, A04 = 2.9365E−07, A06 = 5.2679E−10,
A08 = 0.0000E+00, A10 = 0.0000E+00, A12 = 0.0000E+00

Eighteenth surface

K = 0.0000, A04 = 2.2311E−05, A06 = 4.0812E−08,
A08 = −1.5000E−10, A10 = 0.0000E+00, A12 = 0.0000E+00

Table 20 shown below shows variable distances D0, D2, D7, D10, D12, and D18 in Table 18 at the wide angle end (Wide), the middle position (Middle), and the telescopic end (Tele).

TABLE 20

|     | Wide    | Middle  | Tele    |
| --- | ------- | ------- | ------- |
| D0  | 1700.00 | 2200.00 | 2700.00 |
| D2  | 9.51    | 10.38   | 9.56    |
| D7  | 15.66   | 5.65    | 1.00    |
| D10 | 21.39   | 11.74   | 1.00    |
| D12 | 3.74    | 11.96   | 18.06   |
| D18 | 1.10    | 11.36   | 21.30   |

FIG. 11A is a cross-sectional view of the projection zoom lens 45 according to Example 5 operating at the wide angle end, and FIG. 11B is a cross-sectional view of the projection zoom lens 45 according to Example 5 operating at the telescopic end. The projection zoom lens 45, which enlarges and projects an image formed on each projected surface I at a variable magnification, includes a first lens group G1 having negative power, a second lens group G2 having negative power, a third lens group G3 having positive power, a fourth lens group G4 having positive power, an aperture stop S, a fifth lens group G5 having positive power, and a sixth lens group G6 having positive power sequentially arranged from the high magnification side. To change the magnification, the first lens group G1 and the sixth lens group (last lens group) G6 are fixed and the third lens group G3, the fourth lens group G4, the fifth lens group G5, and other lens groups, which are movable lens groups, are moved for zooming, and to bring a subject into focus, the first lens group G1 is moved for focusing.

The first lens group G1 includes a single lens, that is, a negative meniscus lens L1 having a convex surface facing the high magnification side. The second lens group G2 is formed of the following two lenses: a complex aspheric lens L2 produced by forming a thin aspheric resin layer on the low-magnification-side of a negative meniscus lens having a convex surface facing the high magnification side; and a biconvex positive lens L3. The third lens group G3 includes a doublet formed of the following two lenses: a negative meniscus lens L4 having a convex surface facing the high magnification side; and a positive meniscus lens L5 having a convex surface facing the high magnification side. The fourth lens group G4 includes a single lens, that is, a positive meniscus lens L6 having an aspheric convex surface facing the high magnification side. The fifth lens group G5 is formed of the following three lenses: a doublet formed of a biconcave negative lens L7 and a biconvex positive lens L8; and a positive meniscus lens L9 having an aspheric convex surface facing the low magnification side. The sixth lens group G6 includes a single lens, that is, a biconvex positive lens L10.

Figure 12A:
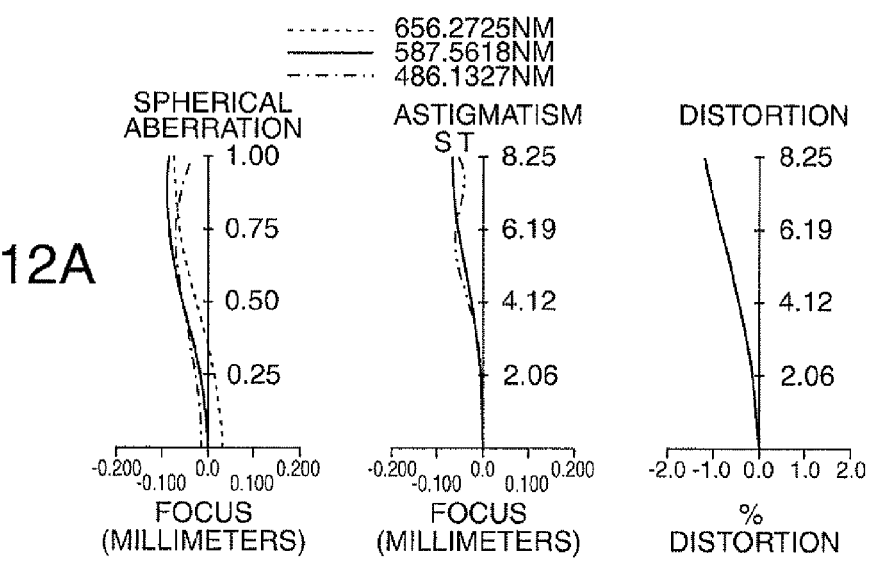
FIGS. 12A to 12C show aberrations produced by the zoom lens according to Example 5.
Figure 12B:
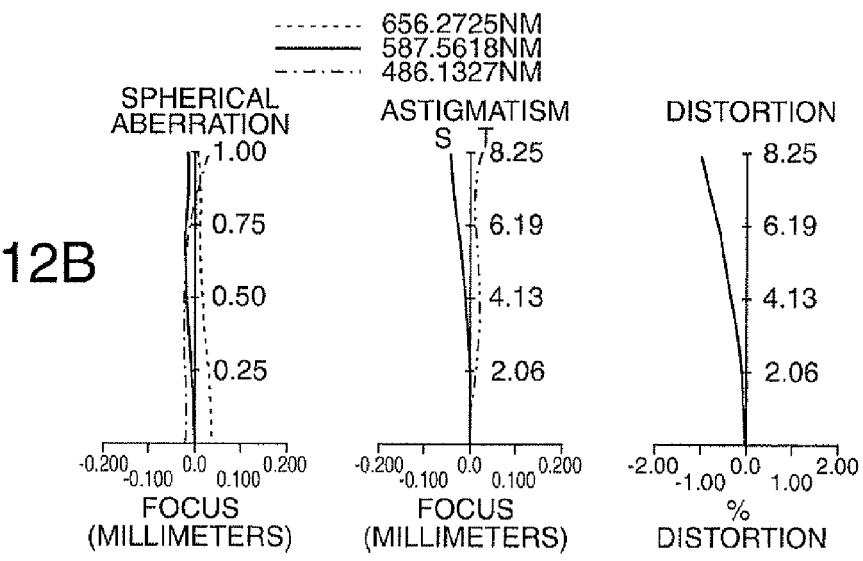
Figure 12C:
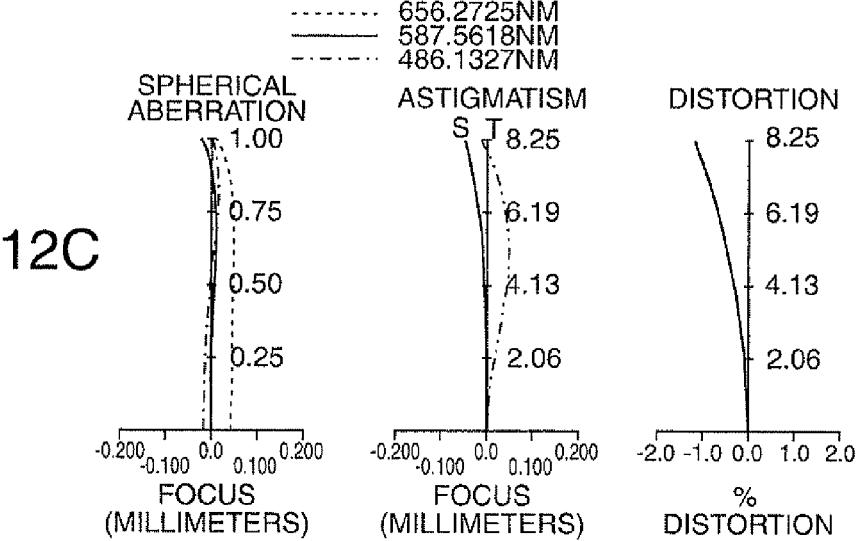

FIG. 12A shows aberrations (spherical aberration, astigmatism, and distortion) produced by the projection zoom lens 45 according to Example 5 operating at the wide angle end. FIG. 12B shows aberrations (spherical aberration, astigmatism, and distortion) produced by the projection zoom lens 45 according to Example 5 operating at the middle position. FIG. 12C shows aberrations (spherical aberration, astigmatism, and distortion) produced by the projection zoom lens 45 according to Example 5 operating at the telescopic end.

Example 6

Table 21 shown below summarizes overall characteristics of a projection zoom lens according to Example 6.

TABLE 21

|  | Wide | Middle | Tele |
| --- | --- | --- | --- |
| FNo | 1.49 | 1.73 | 2.01 |
| F | 13.83 | 17.94 | 22.19 |
| ω | 31.6° | 25.2° | 20.8° |

Table 22 shown below shows data on the lens surfaces in Example 6.

TABLE 22

| Surface number | R | D | nd | vd | dn/dt ($\times 10^{-6}$) | α ($\times 10^{-7}$) |
| --- | --- | --- | --- | --- | --- | --- |
| 0 |  | D0 |  |  |  |  |
| 1 | 1000.000 | 2.00 | 1.51633 | 64.1 | 1.5 | 73.0 |
| 2 | 26.388 | D2 |  |  |  |  |
| 3* | 38.298 | 3.00 | 1.53116 | 56.0 | −108.0 | 700.0 |
| 4* | 18.037 | D4 |  |  |  |  |
| 5* | 46.694 | 3.50 | 1.60737 | 27.0 | −108.0 | 700.0 |
| 6 | 107.516 | D6 |  |  |  |  |
| 7 | 36.813 | 4.92 | 1.74320 | 49.3 | 5.1 | 54.9 |
| 8 | −340.218 | D8 |  |  |  |  |
| ST | 1.00E+18 | 5.57 |  |  |  |  |
| 10 | −31.971 | 1.90 | 1.84666 | 23.8 | 0.2 | 89.1 |
| 11 | 37.694 | 6.22 | 1.58913 | 61.1 | 2.5 | 57.7 |
| 12* | −107.950 | 3.46 |  |  |  |  |
| 13 | −74.233 | 4.28 | 1.58913 | 61.1 | 2.5 | 57.7 |
| 14 | −22.807 | D14 |  |  |  |  |
| 15 | 33.873 | 5.20 | 1.58913 | 61.1 | 2.5 | 57.7 |
| 16 | −181.255 | 5.75 |  |  |  |  |
| 17 | 1.00E+18 | 25.75 | 1.51633 | 64.1 | 1.5 | 73.0 |
| 18 | 1.00E+18 | 3.00 |  |  |  |  |

Table 23 shown below shows aspheric coefficients of the lens surfaces in Example 6.

TABLE 23

Third surface

K = 0.0000, A04 = 2.0258E−05, A06 = −6.0588E−08,
A08 = 9.3752E−11, A10 = 0.0000E+00, A12 = 0.0000E+00

Fourth surface

K = 0.0000, A04 = −2.1790E−06, A06 = −8.6276E−08,
A08 = −2.3525E−10, A10 = 1.3339E−12, A12 = −3.3340E−15

Fifth surface

K = 0.0000, A04 = −1.8678E−06, A06 = −7.7625E−10,
A08 = 0.0000E+00, A10 = 0.0000E+00, A12 = 0.0000E+00

Twelfth surface

K = 7.3638, A04 = 1.8664E−05, A06 = 1.1791E−08,
A08 = −5.7228E−11, A10 = 0.0000E+00, A12 = 0.0000E+00

Table 24 shown below shows variable distances D0, D2, D4, D6, D8, and D14 in Table 22 at the wide angle end (wide), the middle position (Middle), and the telescopic end (Tele).

TABLE 24

|  | Wide | Middle | Tele |
| --- | --- | --- | --- |
| D0 | 1700.00 | 2200.00 | 2700.00 |
| D2 | 7.79 | 7.35 | 4.28 |
| D4 | 38.65 | 32.11 | 30.53 |
| D6 | 15.77 | 8.30 | 1.00 |
| D8 | 11.86 | 13.90 | 15.42 |
| D14 | 1.10 | 13.12 | 23.34 |

FIG. 13A is a cross-sectional view of the projection zoom lens 46 according to Example 6 operating at the wide angle end, and FIG. 13B is a cross-sectional view of the projection zoom lens 46 according to Example 6 operating at the telescopic end. The projection zoom lens 46, which enlarges and projects an image formed on each projected surface I at a variable magnification, includes a first lens group G1 having negative power, a second lens group G2 having negative power, a third lens group G3 having positive power, a fourth lens group G4 having positive power, an aperture stop S, a fifth lens group G5 having negative power, and a sixth lens group G6 having positive power sequentially arranged from the high magnification side. To change the magnification, the first lens group G1 and the sixth lens group (last lens group) G6 are fixed and the third lens group G3, the fourth lens group G4, the fifth lens group G5, and other lens groups, which are movable lens groups, are moved for zooming, and to bring a subject into focus, the first lens group G1 is moved for focusing.

The first lens group G1 includes a single lens, that is, a negative meniscus lens L1 having a convex surface facing the high magnification side. The second lens group G2 includes a single lens, that is, a negative meniscus lens L2 having an aspheric surface on both sides one of which is a convex surface facing the high magnification side. The third lens group G3 includes a single lens, that is, a positive meniscus lens L3 having an aspheric convex surface facing the high magnification side. The fourth lens group G4 includes a single lens, that is, a biconvex positive lens L4. The fifth lens group G5 is formed of the following three lenses: a doublet formed of a biconcave negative lens L5 and a biconvex positive lens L6 having an aspheric surface facing the low magnification side; and a positive meniscus lens L7 having a convex surface facing the low magnification side. The sixth lens group G6 includes a single lens, that is, a biconvex positive lens L8.

The negative meniscus lens L2 in the second lens group G2 and the positive meniscus lens L3 in the third lens group G3 are resin lenses, which means that two resin lenses having oppositely signed power factors are disposed in lens groups disposed adjacent to each other.

Figure 14A:
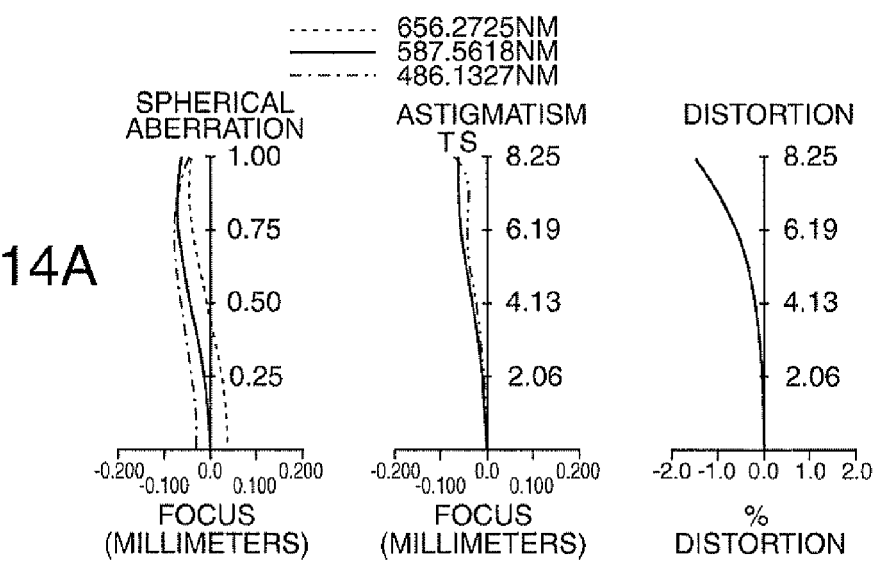
FIGS. 14A to 14C show aberrations produced by the zoom lens according to Example 6.
Figure 14B:
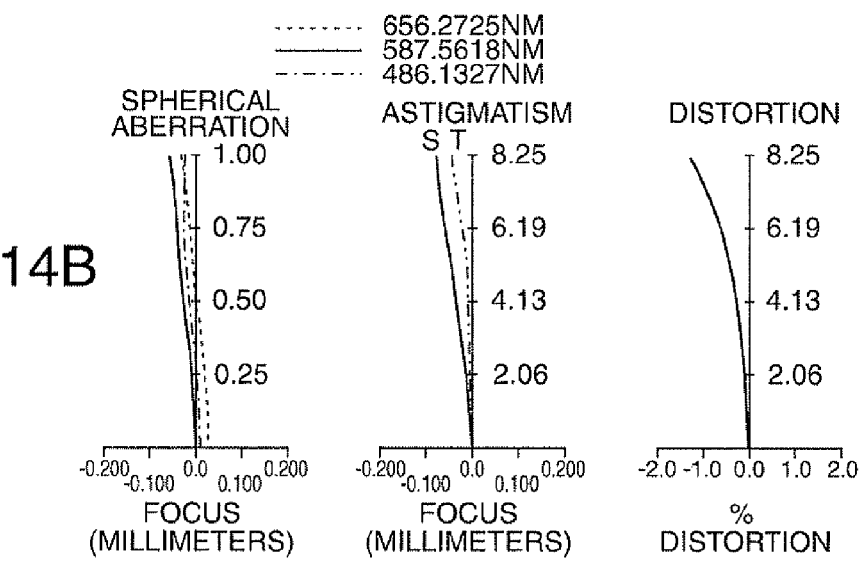
Figure 14C:
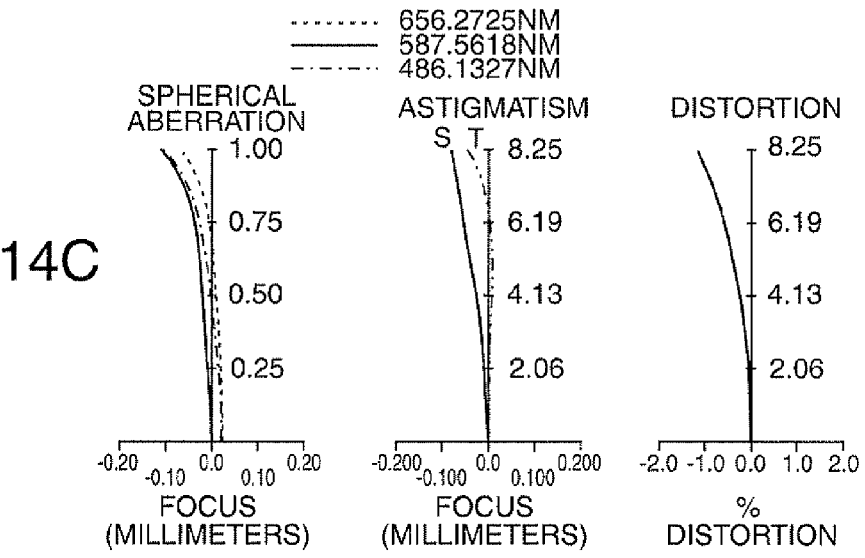

FIG. 14A shows aberrations (spherical aberration, astigmatism, and distortion) produced by the projection zoom lens 46 according to Example 6 operating at the wide angle end. FIG. 14B shows aberrations (spherical aberration, astigmatism, and distortion) produced by the projection zoom lens 46 according to Example 6 operating at the middle position. FIG. 14C shows aberrations (spherical aberration, astigmatism, and distortion) produced by the projection zoom lens 46 according to Example 6 operating at the telescopic end.

Example 7

Table 25 shown below summarizes overall characteristics of a projection zoom lens according to Example 7.

TABLE 25

|  | Wide | Middle | Tele |
| --- | --- | --- | --- |
| FNo | 1.56 | 1.77 | 1.99 |
| F | 15.83 | 20.53 | 25.40 |
| ω | 31.1° | 25.1° | 20.9° |

Table 26 shown below shows data on the lens surfaces in Example 7.

TABLE 26

| Surface number | R | D | nd | vd | dn/dt (×10⁻⁶) | α (×10⁻⁷) |
|---|---|---|---|---|---|---|
| 0 | | D0 | | | | |
| 1 | 80.275 | 2.00 | 1.65844 | 50.9 | 4.3 | 69.0 |
| 2 | 23.140 | D2 | | | | |
| 3* | 36.690 | 3.00 | 1.53116 | 56.0 | −108.0 | 700.0 |
| 4* | 22.058 | 17.17 | | | | |
| 5 | −25.566 | 2.00 | 1.69680 | 55.5 | 4.1 | 58.0 |
| 6 | −42.483 | 0.10 | | | | |
| 7 | 185.266 | 3.50 | 1.60737 | 27.0 | −108.0 | 700.0 |
| 8* | −98.247 | D8 | | | | |
| 9 | 28.585 | 5.00 | 1.65844 | 50.9 | 4.3 | 69.0 |
| 10 | −376.982 | D10 | | | | |
| ST | 1.00E+18 | 0.00 | | | | |
| 12 | 27.920 | 3.80 | 1.72342 | 38.0 | 4.1 | 66.5 |
| 13 | 111.207 | D13 | | | | |
| 14 | −72.062 | 1.50 | 1.80518 | 25.4 | 1.2 | 90.3 |
| 15 | 36.401 | 3.58 | | | | |
| 16 | −17.819 | 2.00 | 1.64769 | 33.8 | 2.3 | 84.1 |
| 17 | 24.528 | 4.80 | 1.58642 | 60.8 | 4.6 | 66.0 |
| 18* | −78.564 | 0.10 | | | | |
| 19 | 83.865 | 6.40 | 1.58913 | 61.1 | 3.8 | 57.7 |
| 20 | −20.946 | D20 | | | | |
| 21 | 37.168 | 5.20 | 1.51633 | 64.1 | 1.5 | 73.0 |
| 22 | −135.890 | 5.75 | | | | |
| 23 | 1.00E+18 | 25.75 | 1.51633 | 64.1 | 1.5 | 73.0 |
| 24 | 1.00E+18 | 3.00 | | | | |

Table 27 shown below shows aspheric coefficients of the lens surfaces in Example 7.

TABLE 27

Third surface

K = 2.3379, A04 = −1.1365E−06, A06 = 0.0000E+00,
A08 = 0.0000E+00, A10 = 0.0000E+00, A12 = 0.0000E+00

Fourth surface

K = 0.0000, A04 = −1.6397E−05, A06 = −1.4618E−08,
A08 = 2.6093E−12, A10 = −3.6300E−14, A12 = −2.9100E−17

Eighth surface

K = −5.6842, A04 = 2.4757E−06, A06 = 1.2638E−09,
A08 = 1.4347E−11, A10 = 0.0000E+00, A12 = 0.0000E+00

Eighteenth surface

K = 0.0000, A04 = 2.9735E−05, A06 = 1.4967E−08,
A08 = 4.2471E−11, A10 = −6.3983E−13, A12 = 0.0000E+00

Table 28 shown below shows variable distances D0, D2, D8, D10, D13, and D20 in Table 26 at the wide angle end (Wide), the middle position (Middle), and the telescopic end (Tele).

TABLE 28

| | Wide | Middle | Tele |
|---|---|---|---|
| D0 | 1700.00 | 2200.00 | 2700.00 |
| D2 | 5.45 | 7.38 | 4.80 |
| D8 | 21.58 | 7.66 | 1.00 |
| D10 | 11.70 | 11.42 | 10.65 |
| D13 | 1.97 | 2.87 | 4.00 |
| D20 | 1.10 | 12.03 | 20.70 |

FIG. 15A is a cross-sectional view of the projection zoom lens 47 according to Example 7 operating at the wide angle end, and FIG. 15B is a cross-sectional view of the projection zoom lens 47 according to Example 7 operating at the telescopic end. The projection zoom lens 47, which enlarges and projects an image formed on each projected surface I at a variable magnification, includes a first lens group G1 having negative power, a second lens group G2 having negative power, a third lens group G3 having positive power, an aperture stop S, a fourth lens group G4 having positive power, a fifth lens group G5 having negative power, and a sixth lens group G6 having positive power sequentially arranged from the high magnification side. To change the magnification, the first lens group G1 and the sixth lens group (last lens group) G6 are fixed and the third lens group G3, the fourth lens group G4, the fifth lens group G5, and other lens groups, which are movable lens groups, are moved for zooming, and to bring a subject into focus, the first lens group G1 is moved for focusing.

The first lens group G1 includes a single lens, that is, a negative meniscus lens L1 having a convex surface facing the high magnification side. The second lens group G2 includes a negative meniscus lens L2 having an aspheric surface on both sides one of which is a convex surface facing the high magnification side, a negative meniscus lens L3 having a convex surface facing the low magnification side, and a biconvex positive lens L4 having an aspheric surface on the low magnification side. The third lens group G3 includes a single lens, that is, a biconvex positive lens L5. The fourth lens group G4 includes a single lens, that is, a positive meniscus lens L6 having a convex surface facing the high magnification side. The fifth lens group G5 includes the following four lenses: a biconcave negative lens L7; a doublet formed of a biconcave negative lens L8 and a biconvex positive lens L9 having an aspheric surface facing the low magnification side; and a biconvex positive lens L10. The sixth lens group G6 includes a biconvex positive lens L11.

The negative meniscus lens L2 and the biconvex positive lens L4 in the second lens group G2 are resin lenses, which means that two resin lenses having oppositely signed power factors are disposed on opposite sides of another lens in a single lens group.

Figure 16A:
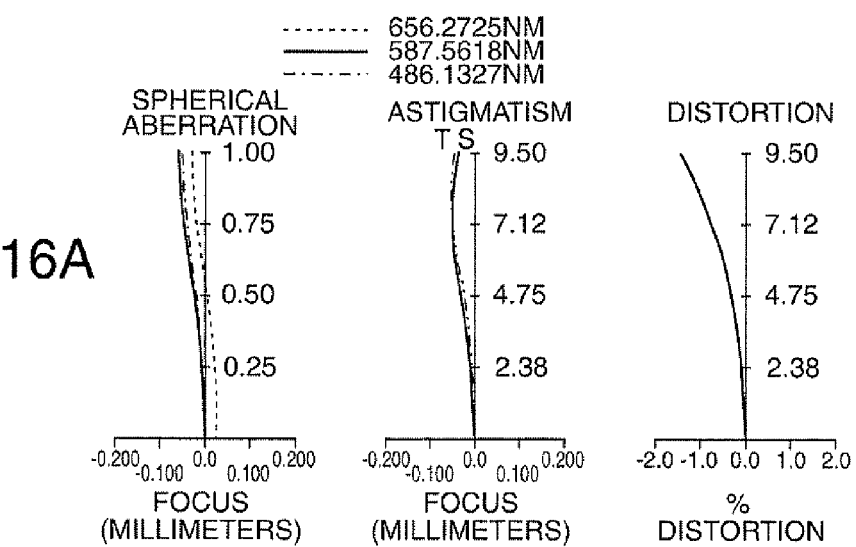
FIGS. 16A to 16C show aberrations produced by the zoom lens according to Example 7.
Figure 16B:
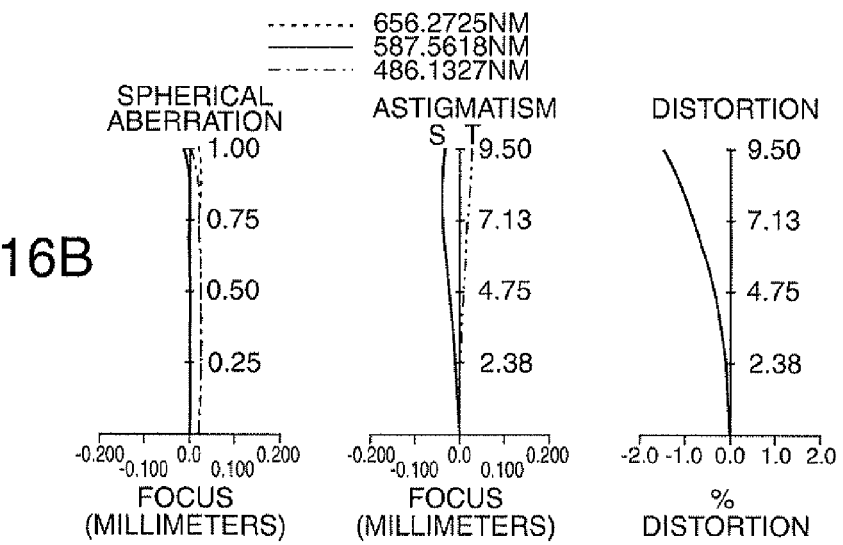
Figure 16C:
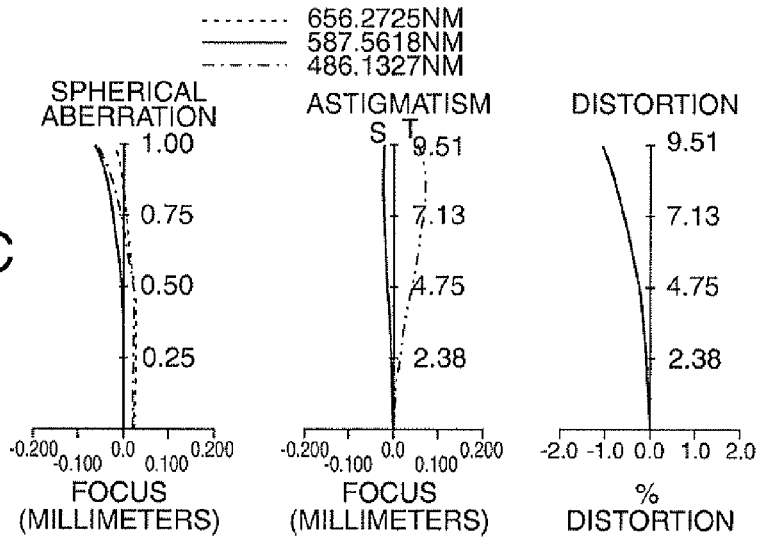

FIG. 16A shows aberrations (spherical aberration, astigmatism, and distortion) produced by the projection zoom lens 47 according to Example 7 operating at the wide angle end. FIG. 16B shows aberrations (spherical aberration, astigmatism, and distortion) produced by the projection zoom lens 47 according to Example 7 operating at the middle position. FIG. 16C shows aberrations (spherical aberration, astigmatism, and distortion) produced by the projection zoom lens 47 according to Example 7 operating at the telescopic end.

Summary of Examples

In each Example, the half angle of view at the wide angle end is as wide as 30° or greater with the first lens group G1 formed of a single negative lens.

As described above, the first lens group has a simple configuration, and the following second lens group is configured to have negative power. The configuration provides sufficiently satisfactory optical performance comparable to that achieved in related art in which the first group is formed of a plurality of lenses, a short total length of the focusing group, and reduction in weight, whereby the portion where the focusing group is connected to a primary lens barrel can be simplified without any degradation in performance of the lens, and the overall size and cost of the lens can be reduced.

Table 29 shown below summarizes numerical data on the conditional expression (1) to (5) in Examples 1 to 7.

TABLE 29

|  | Example 1 | Example 2 | Example 3 | Example 4 | Example 5 | Example 6 | Example 7 |
|---|---|---|---|---|---|---|---|
| Fw/F1 | −0.313 | −0.400 | −0.302 | −0.358 | −0.313 | −0.264 | −0.318 |
| Fw/F3 | 0.307 | 0.320 | 0.326 | 0.322 | 0.239 | 0.105 | 0.392 |
| Fw/FL | 0.307 | 0.283 | 0.284 | 0.261 | 0.302 | 0.284 | 0.278 |
| $\phi p + \phi n$ | — | −0.008 | −0.014 | — | — | — | — |
| Rn/Rp | — | — | — | 0.622 | — | 0.386 | 0.119 |

Table 30 shown below shows the amounts of focus shift produced by the projection zoom lenses in Examples 2, 3, 4, 6, and 7 operating at the wide angle end and the telescopic end when the overall temperature of the projection zoom lenses uniformly increases by +20° C.

TABLE 30

|  | Example 1 | Example 2 | Example 3 | Example 4 | Example 5 | Example 6 | Example 7 |
|---|---|---|---|---|---|---|---|
| Wide angle end | — | 11.6 | −4.7 | −10.8 | — | −2.6 | −7.5 |
| Telescopic end | — | −5.3 | −11.8 | −10.6 | — | −7.6 | 7.8 |

In general, an acceptable depth of focus is determined by using the f-number and the circle of least confusion. Assuming that the diameter of the circle of least confusion is about 12 (μ, the depth of focus is about 20 (μ at the wide angle end and about 25 (μ at the telescopic end in Examples described above. Table 30 clearly shows that the amounts of focus shift well fall within the depths of focus in Examples 2, 3, 4, 6, and 7 when the temperature uniformly increases by +20° C., and that the uniform increase in temperature hardly affects image formation.

The invention is not limited to the embodiment and examples described above and can be implemented in a variety of aspects to the extent that they do not depart from the substance of the invention.

For example, in Examples 2, 3, 4, 6, and 7, at least one lens having no effective power can be added to each of the lens groups G1 to G5 (G6) in a position upstream or downstream of any lens therein or between any lenses therein.

The projection zoom lens 40 can enlarge and project not only images formed on the liquid crystal panels 18G, 18R, and 18B but also images formed on digital micromirror devices that use micromirrors as pixels or a variety of other light modulation devices.

The entire disclosure of Japanese Patent Application No. 2011-227664, filed Oct. 17, 2011 is expressly incorporated by reference herein.

What is claimed is:

1. A projection zoom lens comprising at least the following five lens groups sequentially arranged from an enlargement side:
    a first lens group fixed at the time of zooming and having negative power;
    a second lens group moved at the time of zooming and having negative power;
    a third lens group moved at the time of zooming and having positive power;
    at least one lens group moved at the time of zooming; and
    a last lens group fixed at the time of zooming and having positive power,
    wherein the first lens group is formed of a single negative lens having a steep concave surface facing a reduction side, and
    wherein when the total lens system operating at a wide angle end has a focal length Fw, and the first lens group G1 has a focal length F1, the following conditional expression (1) is satisfied:

$$-0.5 < Fw/F1 < -0.1 \quad (1).$$

2. The projection zoom lens according to claim 1,
    wherein the third lens group, which has positive power, is formed of a single positive lens having a convex surface facing the enlargement side or a doublet formed of positive and negative lenses and having a convex surface facing the enlargement side, and
    when the third lens group has a focal length F3, the following conditional expression (2) is satisfied:

$$0.05 < Fw/F3 < 0.45 \quad (2).$$

3. The projection zoom lens according to claim 1,
    wherein the last lens group, which has positive power, is formed of at least one positive lens, and
    when the last lens group has a focal length FL, the following conditional expression (3) is satisfied:

$$0.2 < Fw/FL < 0.4 \quad (3).$$

4. The projection zoom lens according to claim 1,
    wherein an aperture stop is provided between a certain pair of the movable lens groups, which are moved for zooming, and
    two resin lenses having oppositely signed power factors that are a resin lens disposed on the enlargement side and having negative power and a resin lens disposed on the reduction side and having positive power are disposed on opposite sides of the aperture stop.

5. The projection zoom lens according to claim 4,
    wherein when the resin lens having negative power has a power $\phi n$ and the resin lens having positive power has a power $\phi p$, the following conditional expression (4) is satisfied:

$$-0.02 < \phi p + \phi n < 0 \quad (\phi = 1/f) \quad (4).$$

6. The projection zoom lens according to claim 1,
    wherein an aperture stop is provided between a certain pair of the movable lens groups, which are moved for zooming, and
    two resin lenses having oppositely signed power factors are disposed on the enlargement side with respect to the aperture stop.

7. The projection zoom lens according to claim 6,
    wherein the two resin lenses having oppositely signed power factors are disposed adjacent to each other.

8. The projection zoom lens according to claim 6,
    wherein the two resin lenses having oppositely signed power factors are disposed in a single lens group.

9. The projection zoom lens according to claim 6, wherein the two resin lenses having oppositely signed power factors are disposed in lens groups disposed adjacent to each other.

10. The projection zoom lens according to claim 6, wherein the two resin lenses having oppositely signed power factors are a resin lens having negative power and a resin lens having a positive power sequentially arranged from the enlargement side, and when a reduction-side concave surface of the resin lens having negative power has a radius of curvature Rn, and an enlargement-side convex surface of the resin lens having positive power has a radius of curvature Rp, the following conditional expression (5) is satisfied:

$$0.0 < Rn/Rp < 1.0 \qquad (5).$$

11. The projection zoom lens according to claim 1, wherein the following five lens groups form the entire projection zoom lens: the negative first lens group; the negative second lens group; the positive third lens group; a positive fourth lens group; and a positive fifth lens group that is the last lens group sequentially arranged from the enlargement side.

12. The projection zoom lens according to claim 1, wherein the following six lens groups form the entire projection zoom lens: the negative first lens group; the negative second lens group; the positive third lens group; a positive fourth lens group; a negative fifth lens group; and a positive sixth lens group that is the last lens group sequentially arranged from the enlargement side.

* * * * *